(12) United States Patent
Winkler et al.

(10) Patent No.: US 12,235,097 B2
(45) Date of Patent: Feb. 25, 2025

(54) DIFFRACTIVE OPTICAL ELEMENT FOR A TEST INTERFEROMETER

(71) Applicant: Carl Zeiss SMT GmbH, Oberkochen (DE)

(72) Inventors: Alexander Winkler, Heidenheim (DE); Martin Scheid, Aalen (DE); Hans Michael Stiepan, Aalen (DE); Jochen Hetzler, Aalen (DE); Frank Eisert, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 317 days.

(21) Appl. No.: 17/675,516

(22) Filed: Feb. 18, 2022

(65) Prior Publication Data
US 2022/0170735 A1  Jun. 2, 2022

Related U.S. Application Data

(63) Continuation of application No. PCT/EP2020/072749, filed on Aug. 13, 2020.

(30) Foreign Application Priority Data

Aug. 21, 2019 (DE) ............. 10 2019 212 520.4

(51) Int. Cl.
*G01Q 60/24* (2010.01)
*G01B 11/24* (2006.01)
(Continued)

(52) U.S. Cl.
CPC ......... *G01B 11/2441* (2013.01); *G01Q 60/24* (2013.01); *G02B 5/18* (2013.01); *G02B 5/32* (2013.01)

(58) Field of Classification Search
CPC .............. G01B 11/2441; G01M 11/0271
See application file for complete search history.

(56) References Cited

U.S. PATENT DOCUMENTS

| 5,671,050 A | 9/1997 | de Groot |
| 7,352,453 B2 | 4/2008 | Mieher et al. |

(Continued)

FOREIGN PATENT DOCUMENTS

| CN | 1133434 A | 10/1996 |
| CN | 1427242 A | 7/2003 |

(Continued)

OTHER PUBLICATIONS

Ean-Michel Asfour, "Asphere testing with a Fizeau interferometer based on a combined computer-generated hologram", 2006 (Year: 2006).*

(Continued)

*Primary Examiner* — Maurice C Smith
(74) *Attorney, Agent, or Firm* — Edell, Shapiro & Finnan, LLC

(57) ABSTRACT

A diffractive optical element (10) for a test interferometer (100) measures a shape of an optical surface (102). Diffractive shape measuring structures (16) are arranged on a used surface (14) of the element and generate a test wave (122) irradiating the surface when the element is arranged in the interferometer. At least one test field (18) several profile properties of test structures contained in the test field. The profile properties characterize a profile line of the test structures extending transversely with respect to the used surface and include a flank angle of the profile line, a profile depth and a depth of a microtrench in a bottom region of a trench-shaped profile of the test structures. The test field is arranged at one location of the used surface instead of the diffractive shape measuring structures such that the test field (Continued)

is surrounded by several diffractive shape measuring structures.

20 Claims, 7 Drawing Sheets

(51) Int. Cl.
*G02B 5/18* (2006.01)
*G02B 5/32* (2006.01)

(56) References Cited

U.S. PATENT DOCUMENTS

| | | | |
|---|---|---|---|
| 8,267,981 | B2 | 9/2012 | Doerband et al. |
| 9,311,431 | B2 | 4/2016 | Yoo et al. |
| 2001/0028462 | A1 | 10/2001 | Ichihara et al. |
| 2003/0184762 | A1 | 10/2003 | Kim et al. |
| 2003/0223630 | A1 | 12/2003 | Adel et al. |
| 2006/0274325 | A1 | 12/2006 | Hetzler et al. |
| 2010/0108873 | A1 | 5/2010 | Schwertner |
| 2010/0177321 | A1 | 7/2010 | Hetzler et al. |
| 2011/0191060 | A1 | 8/2011 | Lotze et al. |
| 2013/0076857 | A1 | 3/2013 | Kurashige et al. |
| 2016/0266505 | A1 | 9/2016 | Amit et al. |
| 2018/0106591 | A1 | 4/2018 | Hetzler et al. |
| 2018/0203369 | A1 | 7/2018 | Stiepan et al. |
| 2018/0275524 | A1 | 9/2018 | Den et al. |

FOREIGN PATENT DOCUMENTS

| | | | | |
|---|---|---|---|---|
| CN | 101680749 | A | | 3/2010 |
| CN | 101687302 | A * | | 3/2010 ......... G01B 11/2441 |
| CN | 103097857 | A | | 5/2013 |
| CN | 107646087 | A | | 1/2018 |
| DE | 102008049751 | A1 | | 4/2010 |
| DE | 102015202676 | A1 | | 8/2016 |
| DE | 102015207002 | A1 | | 10/2016 |
| DE | 102015221772 | A1 | | 5/2017 |
| DE | 102016213925 | A1 | | 2/2018 |
| DE | 102018200568 | A1 | | 3/2018 |
| EP | 2705354 | A1 | | 3/2014 |
| FR | 3064760 | A1 | | 10/2018 |
| JP | H0989535 | A | | 4/1997 |
| JP | 2010261934 | A | | 11/2010 |
| KR | 20110068166 | A | | 6/2011 |
| WO | 2008110239 | A1 | | 9/2008 |
| WO | 2012151288 | A1 | | 11/2012 |
| WO | 2013138297 | A1 | | 9/2013 |
| WO | 2014016056 | A1 | | 1/2014 |
| WO | 2016191189 | A1 | | 12/2016 |

OTHER PUBLICATIONS

Xuefeng Zeng, "Mapping distortion correction in freeform mirror testing by computer-generated hologram", 2018 (Year: 2018).*
Poleshchuk et al., "Methods for Certification of CGH Fabrication", Diffractive Optics and Micro-Optics 9DOMO), vol. 2204840, Jan. 1, 2002, 3 pages.
Shimansky, "Error Measurement Method in the Fabrication of Precision Synthesized Holograms on Circular Laser Writing Systems", Optoelectronics, Instrumentation and Data Processing, Allerton Press, Inc., vol. 55, No. 3, Aug. 3, 2019, 6 pages.
Poleshchuk et al., "Computer generated holograms: Fabrication and application for precision optical testing", Proceedings of SPIE, IEEE, vol. 7102, Jan. 1, 2008, 9 pages.
International Search Report, PCT/EP2020/072749, Nov. 30, 2020, 3 pages.
Zhang et al., "Improvcing optical measurement uncertainty with combined multitool metrology using a Bayesian approach", Applied Optics, vol. 51, No. 25, Sep. 1, 2012, 11 pages.
German Office Action with English translation, Application No. 10 2019 212 520.4, Apr. 9, 2020, 11 pages.
International Preliminary Report on Patentability and the Written Opinion, PCT/EP2020/072749, Feb. 17, 2022, 8 pages.
Germer et al., "Developing an Uncertainty Analysis for Optical Scatterometry", Proc of SPIE, vol. 7272, (2009), 11 pages.
Asfour et al., "Asphere testing with a Fizeau interferometer based on a combined computer-generated hologram", J. Opt. Soc. Am. A/vol. 23, No. 1, Jan. 2006, pp. 172-178.
Chinese Office Action and Search Report with English translation, Application No. 202080068030.X, Feb. 29, 2024, 44 pages.

* cited by examiner

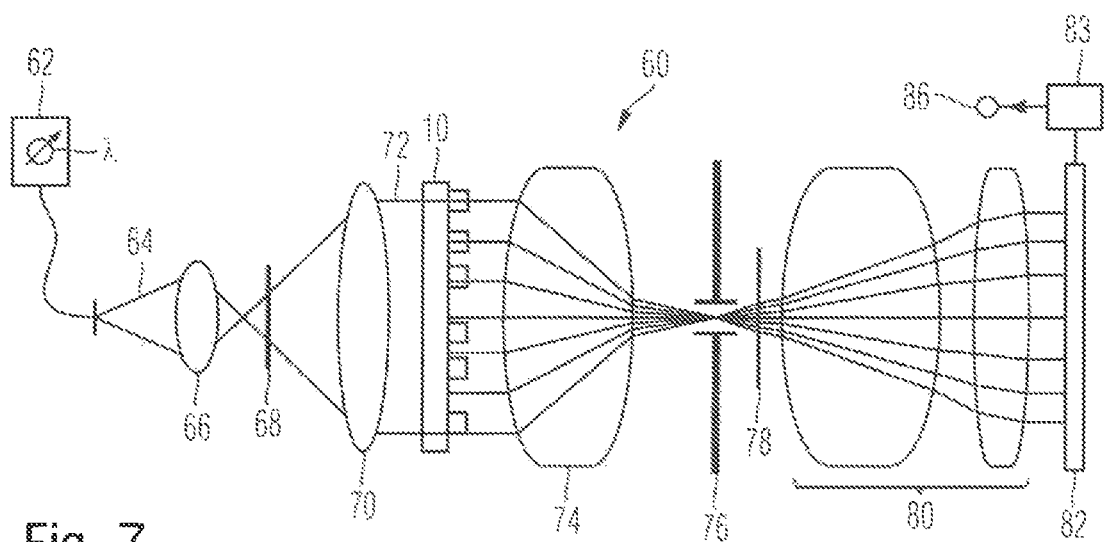
Fig. 7
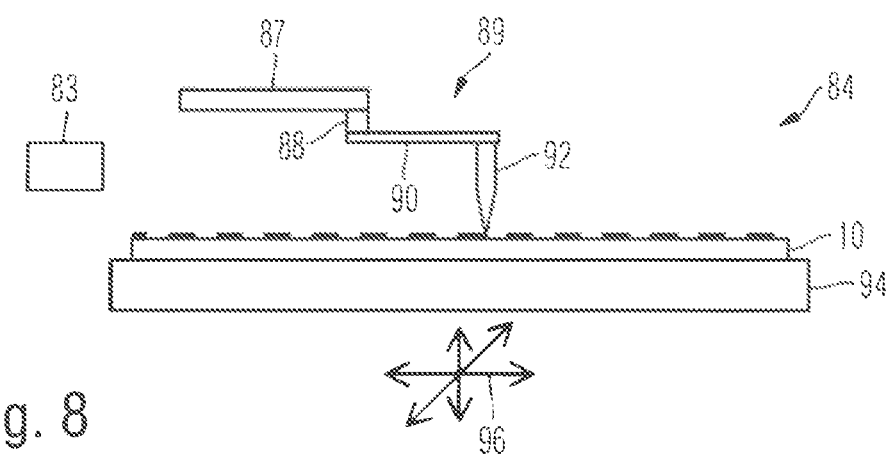
Fig. 8
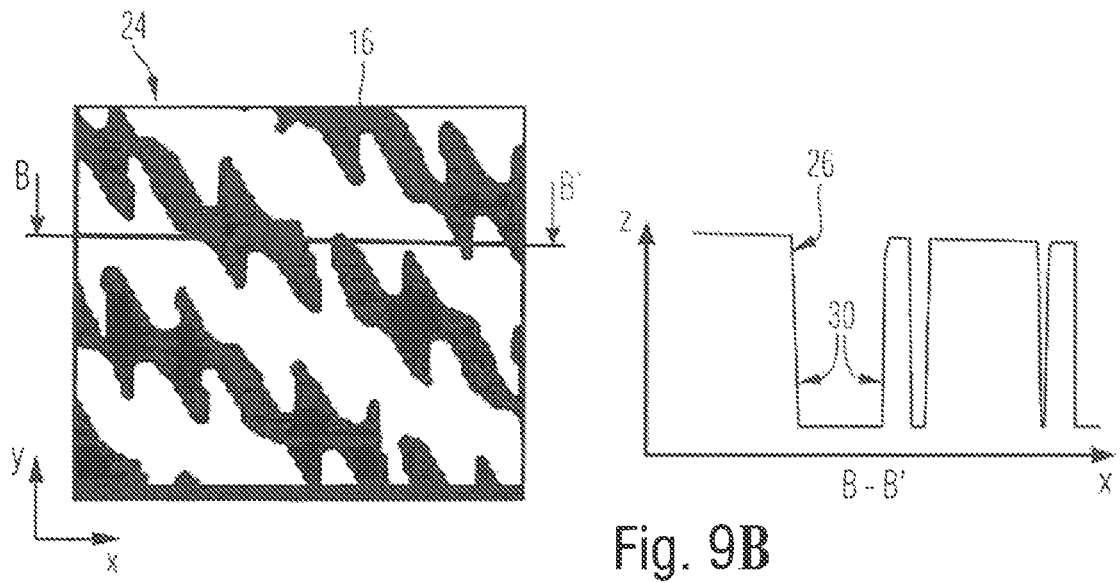
Fig. 9A
Fig. 9B

DIFFRACTIVE OPTICAL ELEMENT FOR A TEST INTERFEROMETER

CROSS REFERENCE TO RELATED APPLICATIONS

This is a Continuation of International Application PCT/EP2020/072749, which has an international filing date of Aug. 13, 2020, and the disclosure of which is incorporated in its entirety into the present Continuation by reference. In addition, the present Continuation claims the benefit of and priority to German patent application 10 2019 212 520.4, filed Aug. 21, 2019. The entire content and disclosure of this German patent application is also incorporated by reference into the present Continuation.

FIELD OF THE INVENTION

The invention relates to a diffractive optical element for a test interferometer for measuring a shape of an optical surface, to a test interferometer of this type, to a calibration method for calibrating a diffractive optical element, to a measuring method for measuring a shape of an optical surface, and to a method for producing diffractive optical elements.

BACKGROUND

Microlithography is used for production of microstructured components, such as integrated circuits or LCDs, for example. The microlithography process is carried out in what is known as a projection exposure apparatus, which comprises an illumination device and a projection lens. In projection lenses designed for the EUV range, which are operated in the wavelength range below 100 nm, e.g. at approximately 13.5 nm or approximately 6.8 nm, mirrors are used as optical components for the imaging process. A highly accurate test of the mirror surfaces is carried out in a test interferometer, in particular, in which a diffractive optical element in the form of a computer-generated hologram (CGH) is used for adapting the test wave to a target shape of the mirror surface to be tested.

In practice there is a need, in the context of testing the mirror surfaces, to reliably differentiate the surface defects to be ascertained from the manufacturing defects typically present in the CGH. DE 10 2018 200 568 A1 describes in this regard a characterization of the CGH with regard to said manufacturing defects using a so-called diffraction measuring station.

In addition to the defects in the structure pattern of the diffraction structures in the plane of the CGH surface, what are also of great significance are defects in the geometry of the diffraction structures, in particular in the profile line of the diffraction structures, i.e. the profile of the diffraction structures in the sectional image transversely with respect to the CGH surface. The profile lines, but also particularly small manufacturing defects in the plane of the CGH surface (contour deviations), of complex diffraction structures on the CGH can be reconstructed in a conventional way only very inaccurately from the measurements of the diffraction measuring station.

SUMMARY

It is an object of the invention to provide a diffractive optical element, a test interferometer, a calibration method and a measuring method or else a combination of measuring methods of the type mentioned in the introduction which enable the problems mentioned above to be solved and with which in particular a geometric property of diffraction structures on a diffractive optical element for a test interferometer can be measured with a high accuracy.

Solution According to the Invention

The object mentioned above can be achieved according to the invention for example by a diffractive optical element for a test interferometer for measuring a shape of an optical surface which comprises: diffractive shape measuring structures arranged on a used surface of the diffractive optical element and configured to generate a test wave for irradiating the optical surface to be measured when the diffractive optical element is arranged in the test interferometer, and at least one test field configured for measuring a plurality of profile properties of test structures contained in the test field. The profile properties characterize a profile line of the test structures extending transversely with respect to the used surface and comprise a flank angle of the profile line of the test structures, a profile depth of the test structures and a depth of a microtrench which occurs in a bottom region of a trench-shaped profile of the test structures. The test field is arranged at one location of the used surface instead of the diffractive shape measuring structures such that the test field is surrounded by a plurality of the diffractive shape measuring structures.

The wording according to which the test field is surrounded by a plurality of the diffractive shape measuring structures means that the diffractive shape measuring structures are arranged around the test field at least at an angle of 180°, in particular at the angle of 360°. In this case, the diffractive shape measuring structures can surround the test field over the whole area or else be arranged in area regions around the test field such that gaps remain between the area regions.

In particular, a plurality of test fields of this type are in each case arranged at locations of the used surface instead of the diffractive shape measuring structures such that the respective test field is surrounded by a plurality of the diffractive shape measuring structures. The profile properties characterizing a profile line of the test structures extending transversely with respect to the used surface in each case represent a geometric property of the test structures.

The provision of at least one test field at one location of the used surface with the test structures mentioned makes it possible to measure the profile properties of the test structures contained therein with a high measurement accuracy, to derive therefrom a corresponding profile property for the diffractive shape measuring structures and thus to determine the geometric property of the diffractive shape measuring structures with a high accuracy.

The indication that the shape measuring structures are diffractive should be understood to mean that they have a diffractive property in relation to the wavelength of the test wave used in the test interferometer.

The profile depth is also often referred to as etching depth, since the profile shape is usually formed by etching processes. A microtrench, which is often also referred to using the English term "μ-trench", constitutes a substructure in comparison with the main trench constituted by the trench-shaped profile, that is to say that it is significantly smaller than the main trench.

In accordance with one embodiment, the used surface is arranged on a top side of the diffractive optical element, the top side comprises a central region comprising at least 50% of its area, and the test field is arranged in the central region. The central region of the top side defined in this way is thus completely surrounded by an edge region.

In accordance with a further embodiment, test fields, in particular at least 10 test fields, at least 50 test fields or at least 100 test fields, are arranged at a plurality of locations of the used surface in each case instead of the diffractive shape measuring structures such that the respective test field is surrounded by a plurality of the diffractive shape measuring structures. The shape measuring structures and the test fields are arranged in each case at a plurality of locations of the used surface, that is to say that they are arranged in each case in a manner distributed over the used surface. The locations at which the shape measuring structures are arranged differ from the locations at which the test fields are arranged.

In accordance with a further embodiment, at least some of the test fields have a regular arrangement. In accordance with a further embodiment, at least some of the test fields have an irregular arrangement.

In accordance with a further embodiment, the test structures and the shape measuring structures each have a structure pattern extending along the used surface and a profile line extending transversely with respect to the used surface and characterized by at least one profile property, wherein the structure pattern of the test structures is configured such that a measurement accuracy achievable during a measurement of the profile property of the test structures is increased by comparison with a further measurement accuracy achievable during a measurement of the profile property of the shape measuring structures.

The profile shape measurement of the shape measuring structures concerns the measurement of the profile shape of the shape measuring structures, which likewise extends transversely with respect to the used surface. In particular, the measurement accuracy achievable in each case during the profile shape measurement of the test structures and of the shape measuring structures relates to the same measurement method. An increased measurement accuracy should be understood to mean that the maximum deviation of the measured shape from the actual shape is reduced.

In accordance with a further embodiment, the test fields each comprise a set of test structures, wherein the structure patterns of the test structures in each set are of the same type, in particular identical. That is to say that the structure patterns of the test structures in the set of a first test field are likewise contained in a form of the same type, or in identical form, in the set of another test field. Form of the same type should be understood to mean that an essential structure pattern remains the same, or varies maximally by +/−10% while another parameter of the test structures can vary to a greater extent. In this regard, the test structures of the individual test fields may remain the same in terms of their periodicity, for example, whereas however the degree of area occupancy of the test structures is varied from test field to test field, for instance by varying the line width.

In accordance with a further embodiment, structure patterns of different test structures of a respective test field are configured for measuring different profile properties of the test structures. That is to say that the structure pattern of a first type of test structures of the respective test field is configured for measuring a first property of the profile shape of the first type of test structures, and the structure pattern of a second type of test structures of the respective test field is configured for measuring the second property of the profile shape of the test structures, etc.

In accordance with a further embodiment, a structure pattern of the test structures is configured for a measurement with a diffraction measuring station. In other words, the structure pattern of the test structures is configured such that a measurement of the at least one profile property of the test structures with a diffraction measuring station is possible; in particular, the structure pattern is optimized for measurement with a diffraction measuring station. In this case, in particular, the shape of the test structures can be designed such that the at least one profile property to be measured is measurable with a higher accuracy using a diffraction measuring station than by using other measuring methods. In accordance with this embodiment, the test structures are diffractive test structures in relation to the wavelength used by the diffraction measuring station.

In accordance with a further embodiment, a structure pattern of the test structures is configured for measurement with a scanning probe microscope. A scanning probe microscope, also designated as SPM, can be embodied as a scanning force microscope or as an atomic force microscope (AFM). In other words, the structure pattern of the test structures is configured such that a measurement of at least one property of the profile shape of the test structures using a scanning probe microscope is possible; in particular, the structure pattern is optimized for measurement with a scanning probe microscope. In this case, in particular, the shape of the test structures can be designed such that the at least one property to be measured of the profile shape is measurable with a higher accuracy using a scanning probe microscope than by using other measuring methods.

In accordance with a further embodiment, a structure pattern of the test structures is configured both for measurement with a diffraction measuring station and for measurement with a scanning probe microscope.

In accordance with a further embodiment, the test structures of the test field comprise at least one structure pattern configured for measurement with a diffraction measuring station, and also at least one further structure pattern configured for measurement with a scanning probe microscope.

In accordance with a further embodiment, a structure pattern of the test structures has periodically repeating and identically oriented edges, wherein the periodicity of the edges lies below a resolution of a diffraction measuring station operated with visible light. In accordance with one embodiment, the resolution of a diffraction measuring station operated with visible light lies below 300 µm, in particular below 100 µm, below 50 µm or below 10 µm. In particular, the periodically repeating edges have a spacing of between 100 nm and 1 µm.

The periodically repeating edges can be, for instance, the edges of periodically arranged parallel straight lines, which edges each point in the same direction. That is to say that the lines are parallel to one another and, in accordance with one embodiment, have a periodicity of between 100 nm and 2 µm, in particular between 300 nm and 1000 nm, e.g. approximately 500 nm. In this case, the ratio of the line width to the interspace between the lines can vary from 1:1 to 1:10. In the case of a width-to-interspace ratio of 1:1, the periodicity of the line pattern is double the magnitude of the respective line width. In accordance with various embodiments, the line width can be at most 1000 nm, at most 500 nm, at most 300 nm, at most 200 nm or at most 50 nm.

In accordance with one embodiment variant, the test fields each contain a plurality of structure patterns which differ in terms of different combinations of the parameters mentioned above. For example, the various structure patterns have different edge periodicities; in this regard, for instance, one structure pattern can have an edge periodicity of 100 nm, a second of 500 nm and a third of 1 μm etc. Furthermore, the test fields can contain structure patterns with mutually deviating width-to-interspace ratios etc.

Furthermore, the periodically repeating edges can also be the edges of periodically arranged parallel lines having regular interruptions, which edges point in the same direction. In this case, the interruptions can be offset from line to line alternately in the line direction, thus resulting in a brick pattern.

In accordance with a further embodiment, the edge periodicity is less than 4 μm, in particular less than 1 μm or less than 400 nm.

In accordance with a further embodiment, the test fields each comprise further test structures having likewise periodically repeating and identically oriented edges, wherein the edges of the further test structures are oriented transversely, in particular perpendicularly, with respect to the edges of the first test structures.

In accordance with a further embodiment, the test structures have periodically arranged two-dimensional structures. The latter can be e.g. rectangular structures, in particular the brick pattern mentioned above, or structures with line segments arranged perpendicularly to one another, such as e.g. structures in the shape of the letter "F".

In accordance with a further embodiment, the test field comprises an unstructured test field section or the test fields each comprise an unstructured test field section, wherein the diffractive optical element has an antireflection coating at least in the region of the unstructured test field section. In particular, the antireflection coating is arranged on the rear side of the diffractive optical element, i.e. on that side of the diffractive optical element which is opposite to the used side of the diffractive optical element having the diffractive shape measuring structures.

In accordance with a further embodiment, the test field has or the test fields have in each case a test field section with shape measuring structures that is used for monitoring. This test field section is also referred to as a background window. It is used for a monitoring measurement to establish whether the region in which the relevant test field is arranged on the diffractive optical element is representative of the locations of the used surface which contain the shape measuring structures used during the measurement with the test interferometer. In order to carry out the reference measurement, for instance, firstly a shape measuring structure provided for the measurement with the test interferometer in the closest possible vicinity of the reference test field section can be measured with the measurement method of choice, such as, for instance, by measurement in the diffraction measuring station or measurement with a scanning probe microscope. Afterward, the abovementioned shape measuring structures in the reference test field section of the test field are measured by the same measurement method. By comparing the measurement results, it can be ensured that the measurements in the test field are representative of the shape measuring structures provided for the measurement with the test interferometer.

In accordance with a further embodiment, the test field comprises or the test fields comprise in each case a test field section serving as reference with reference structures that are resolvable using an optical microscope. These reference structures can comprise markings that can be used to check a correct alignment of the test fields both with regard to rotation and with regard to translation. Furthermore, the reference structures can each comprise an identification number for unambiguous assignment of the measurements established with regard to a specific test field to design properties of the test structures on which the measurements are based.

Furthermore, the invention provides a test interferometer for measuring a shape of an optical surface which comprises a diffractive optical element in one of the above-described embodiments or embodiment variants. Furthermore, the test interferometer comprises an interferometry module for generating an interference pattern by superimposing a reference wave with the test wave generated with the diffractive shape measuring structures after the interaction of said test wave with the optical surface, and an evaluation unit for determining the shape of the optical surface by evaluating the interferogram taking account of at least one predetermined calibration value of the diffractive optical element.

Furthermore, the invention provides a calibration method for calibrating a diffractive optical element comprising diffractive shape measuring structures arranged on a used surface of the diffractive optical element and each configured to generate a test wave when the diffractive optical element is arranged in a test interferometer configured for measuring a shape of an optical surface, said test wave serving for irradiating the optical surface to be measured. The calibration method according to the invention comprises arranging the diffractive optical element in a measuring device and measuring test fields arranged at a plurality of locations of the used surface and each having test structures having a profile line extending transversely with respect to the used surface, for ascertaining a plurality of profile properties of the test structures relating to the profile line. The profile properties comprise a flank angle of the profile line of the test structures, a profile depth of the test structures and a depth of a microtrench which occurs in a bottom region of a trench-shaped profile of the test structures. Furthermore, the calibration method according to the invention comprises determining, from the profile properties ascertained, a calibration value serving for the calibration of the shape measuring structures during the measurement of the optical surface.

The calibration value can then be taken into account during the measurement of the shape of the optical surface in the test interferometer, in which the test wave used in this case is generated with the shape measuring structures. The calibration value is ascertained in particular by simulation calculation using Maxwell's equations. The profile depth is also often referred to as etching depth, since the profile shape is usually formed by etching processes. A microtrench, which is often also referred to using the English term "μ-trench", constitutes a substructure in comparison with the main trench constituted by the trench-shaped profile, that is to say that it is significantly smaller than the main trench.

In accordance with various embodiments, the diffractive optical element calibrated in the calibration method is configured in accordance with one of the above-described embodiments or embodiment variants.

In accordance with a further embodiment of the calibration method, the measuring device comprises a diffraction measuring station, during the measurement of the test fields a plurality of test waves each differing in at least one optical parameter are radiated onto the test fields and at least one of the profile properties is ascertained by evaluation of intensity distributions of the test waves recorded with the diffraction measuring station after interaction with the test fields.

In accordance with a further embodiment, the different test waves differ in their wavelength and/or their polarization. In accordance with one embodiment, the wavelengths are between 300 nm and 800 nm. In accordance with various embodiments, test waves having at least 4, e.g. 7 to 12, wavelengths and 2 to 4 different polarization directions are used. In the case of e.g. 7 different wavelengths and 4 different polarization directions (for instance 0°, 45°, 90° and 135°), 28 test waves each having different optical parameters are radiated onto the test fields.

In accordance with a further embodiment, the measuring device comprises a scanning probe microscope. In accordance with a further embodiment, the profile properties furthermore comprise a structure width of the test structures.

In accordance with a further embodiment, in the calibration method, furthermore, at least one contour property of the test structures, i.e. a shape property of a structure pattern which extends along the used surface and which is formed by the test structures, is ascertained and a further calibration value for calibrating the shape measuring structures is determined therefrom. In other words, a contour property describes a deviation of the plan view contour from a required target contour, in particular anisotropic deviations therefrom. In accordance with one embodiment variant, the profile properties comprise a structure width of the test structures.

In accordance with a further embodiment, in the calibration method, furthermore, the transmission or reflection properties of unstructured regions (effect of an antireflection layer) of the diffractive optical element are determined from the test fields.

In accordance with a further embodiment, the test fields are measured using a plurality of different measurement methods and the profile properties are determined by computation of the measurement results ascertained using the different measurement methods. The different measurement methods can comprise the above-described method for determining the at least one of the profile properties by intensity distributions recorded with a diffraction measuring station and the method for determining the at least one of the profile properties with a scanning probe microscope. Further measurement methods that can be used here comprise transmission electron measurements (TEM), measurements using a near field scanning microscope, such as, for instance, so-called TSOM (Through Focus Scanning Optical Microscope), x-ray measurements (XRT), and scatterometry methods carried out independently of the diffraction measuring station, such as goniometry, ellipsometry, reflectometry, etc.

The computation of the measurement results ascertained using the different measurement methods can be effected for example using the Bayesian approach described in the publication "Improving optical measurement uncertainty with combined multitool metrology using a Bayesian approach", Applied Optics, Vol. 51, No. 25, September 2012, pages 6196-6206, using iteration back and forth and/or using a parameter separation. Furthermore, it is possible to use a common comprehensive model for the different measurement methods.

Furthermore, the invention provides a measuring method for measuring a shape of an optical surface which comprises: Determining a calibration value of a diffractive optical element using the calibration method in one of the above-described embodiments or embodiment variants, generating a test wave with the shape measuring structures of the diffractive optical element, recording an interferogram generated by superimposing a reference wave with the test wave after interaction with the optical surface, and determining the shape of the optical surface by evaluating the recorded interferogram taking account of the calibration value.

Furthermore, the invention provides a method for producing diffractive optical elements for a test interferometer for measuring a shape of an optical surface. The method according to the invention comprises: Producing the diffractive optical elements with in each case diffractive shape measuring structures arranged on a used surface of the respective diffractive optical element and configured to generate a test wave for irradiating the optical surface to be measured when the respective diffractive optical element is arranged in the test interferometer, wherein at least one test field is arranged at one location of the used surface of each of the diffractive optical elements instead of the diffractive shape measuring structures such that the at least one test field is surrounded by a plurality of the diffractive shape measuring structures. Furthermore, the method according to the invention comprises measuring the test fields of the diffractive optical elements in order to monitor a stability of the production process.

In accordance with one embodiment, the test field or the test fields is/are of identical design on the different diffractive optical elements. In particular, the respective test field is configured for measuring at least one geometric property of test structures contained in the test field. The diffractive optical elements produced in the production method can be present in particular in the above-described embodiments or embodiment variants of the diffractive optical element according to the invention.

BRIEF DESCRIPTION OF THE DRAWINGS

The above and further advantageous features of the invention are illustrated in the following detailed description of exemplary embodiments according to the invention with reference to the accompanying schematic drawings. In the drawings:

FIG. 7 shows an embodiment of a diffraction measuring station for measuring profile properties of test structures in the test fields of the diffractive optical element in accordance with FIG. 1, FIG. 8 shows an embodiment of a scanning probe microscope for measuring profile properties of test structures in the test fields of the diffractive optical element in accordance with FIG. 1, FIG. 9A shows a further detail of an embodiment of a structure pattern of the diffractive shape measuring structures in accordance with FIG. 1 in plan view, FIG. 9B shows a cross section through the diffractive shape measuring structures in accordance with FIG. 9A along the line B-B'.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
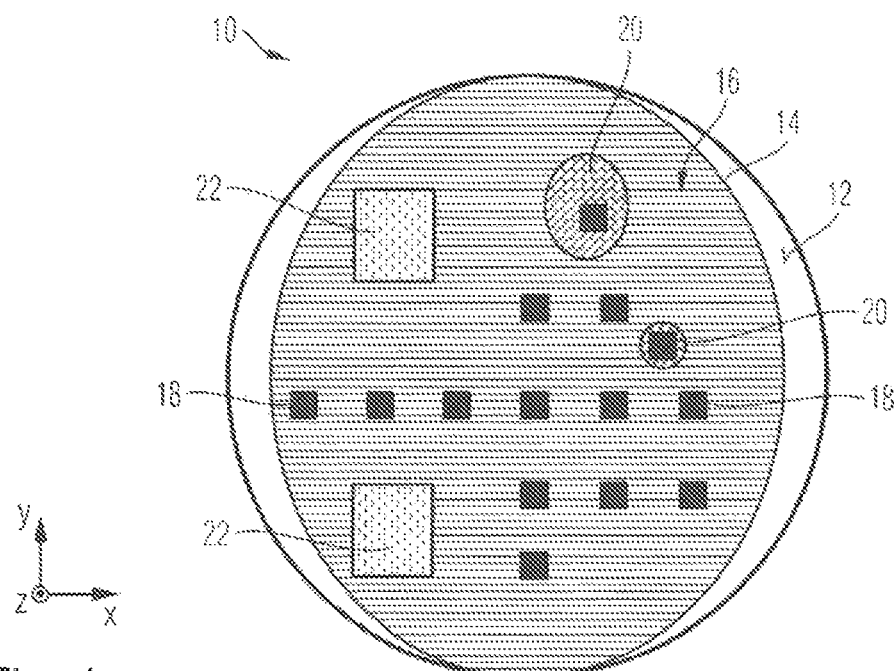
FIG. 1 shows an embodiment of a diffractive optical element comprising diffractive shape measuring structures arranged on a used surface and test fields distributed over the used surface, in plan view.

In order to facilitate the description, a Cartesian xyz-coordinate system is indicated in the drawing, from which system the respective positional relationship of the components illustrated in the figures is evident. In FIG. 1, the z-direction extends perpendicularly to the plane of the drawing out of said plane, the x-direction extends toward the right, and the y-direction extends upward.

FIG. 1 shows an embodiment of a diffractive optical element 10 in the form of a computer-generated hologram (CGH). The diffractive optical element 10 serves for measuring a shape of an optical surface 102 of a test object 104 with a test interferometer 100, as explained in greater detail below with reference to FIG. 6. For this purpose, the diffractive optical element 10 comprises diffractive shape measuring structures 16 in the form of CGH structures arranged on a used surface 14 of the diffractive optical element 10. The used surface 14 extends over a large portion of a surface 12 of the diffractive optical element 10. In the present embodiment, the diffractive optical element 10 is configured as a circular disk and the surface 12 corresponds to the top side of the circular disk. In the present embodiment, the used surface 14 is embodied in elliptical fashion, the semiminor axis being oriented in the x-direction, such that the left and right edge sections of the surface 12 do not belong to the used surface 14.

In the present embodiment, the used surface 14 is completely covered by the diffractive shape measuring structures 16, with the exception of areas provided for the test fields 18. The test fields 18, also referred to as markers, are arranged at a multiplicity of locations of the used surface 14, wherein some of the test fields 18 have a regular arrangement. However, so-called forbidden regions 22 and preferred regions 20 are also defined on the used surface 14. While no test fields 14 are arranged in the forbidden regions 22, test fields 14 are arranged particularly preferably or in particularly high density in the preferred regions 20. The exact structure of the test fields 14 is explained in greater detail below with reference to FIGS. 4 and 5A-5F.

Figure 6:
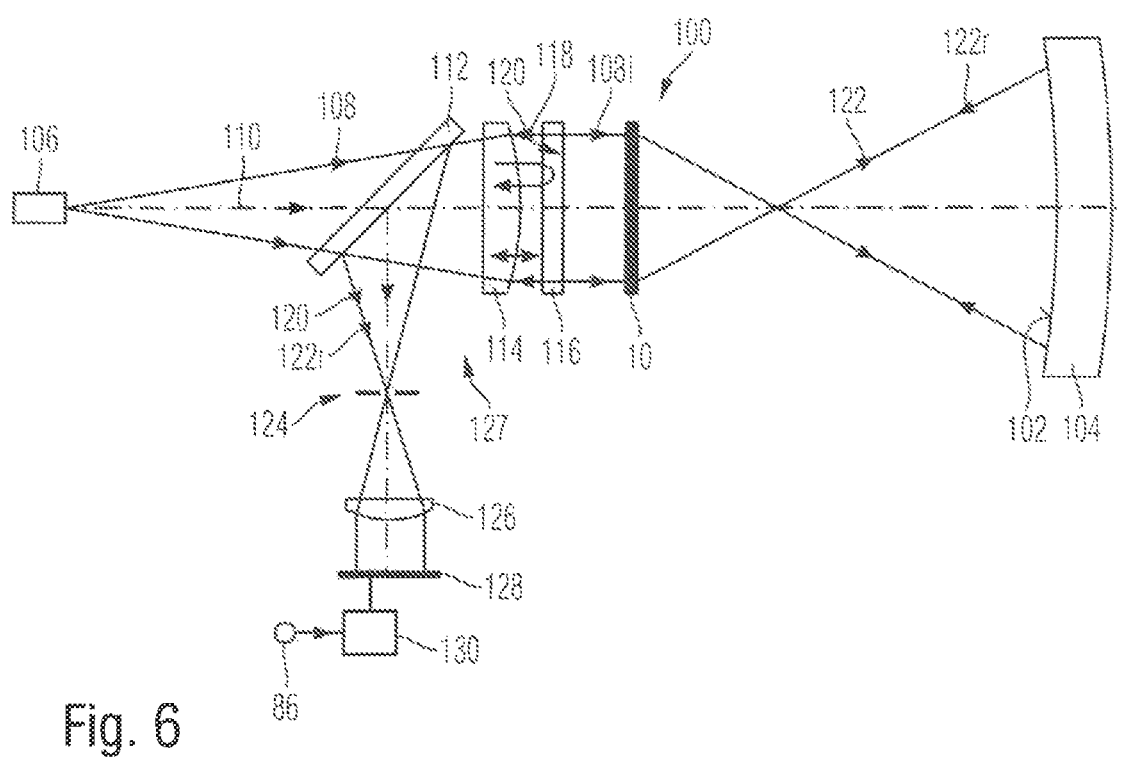
FIG. 6 shows an embodiment of a test interferometer for measuring a shape of an optical surface using the diffractive optical element in accordance with FIG. 1.

FIG. 6 illustrates an embodiment according to the invention of the abovementioned test interferometer 100 for measuring a shape of an optical surface 102 of a test object 104. In the case illustrated, the optical surface 102 is the surface of a mirror. Alternatively, for instance, the surface of a lens element can also be examined. The test interferometer 100 is embodied as a high coherence interferometer in the form of a Fizeau interferometer. The test interferometer 100 comprises a test radiation source 106 for generating a test radiation 108, e.g. in the visible wavelength range. The test radiation source 106 can comprise a laser, for example, such as a helium-neon laser, for instance. The test radiation 108 propagates along an optical axis 110 of the test interferometer 100 and firstly passes through a beam splitter 112.

The test radiation 108 thereupon impinges on a focusing lens element in order to convert the test radiation 108 into a plane wave, which thereupon impinges on a reference element 116 in the form of a Fizeau element having a Fizeau surface 118. Part of the test radiation 108 is reflected as a reference wave 120 at the Fizeau surface 118. In the present example, that portion of the test radiation 108 which passes through the Fizeau surface 118 has a plane wavefront and is referred to hereinafter as incoming test radiation 108i. The incoming test radiation 108i thereupon passes the diffractive optical element 10. In this case, the wavefront of the test radiation 108i is adapted to a target shape of the surface 102 of the test object 104 by the diffractive shape measuring structures 16 arranged on said diffractive optical element. The wave that arises in this case is referred to here as a test wave 122.

The test wave 122 having the adapted wavefront is thereupon reflected at the surface 102 to be measured. The reflected test wave 122r returns in the beam path of the incoming test radiation 108i in the opposite direction, in the process passes through the diffractive optical element 10 and the reference element 116 and is thereupon directed by the beam splitter 112 together with the reference wave 120 via a stop 124 and an eyepiece 126 onto the surface of a detector camera 128. In this text, the arrangement comprising the reference element 116, the focusing lens element 114, the beam splitter 112, the stop 124 and the eyepiece 126 is also referred to as an interferometry module 127.

On the detector camera 128, an intensity distribution in the form of an interferogram arises as a result of these two radiation portions being superimposed. In the embodiment according to the invention, the reference element 116 is connected to a displacement unit, e.g. in the form of a piezoelement. The displacement unit allows the reference element 116 to be displaced in the direction of the optical axis 110 by fractions of the wavelength of the test radiation 108. The phase of the reference wave 120 can be varied by such displacement. This has the consequence that the intensity distributions generated on the detector camera 128 are varied. The intensity distributions that arise for different positions of the reference element 116 are recorded by the detector camera 128 and evaluated in an evaluation unit 130.

In this case, predetermined calibration values 86 of the diffractive optical element 10 are taken into account by the evaluation unit 130. The calibration values 86 concern profile properties 36 of the diffractive shape measuring structures 16, which characterize a profile line 26 of the shape measuring structures 16 extending transversely with respect to the used surface 14. The procedure for determining the calibration values 130 is explained in detail below. The result of the evaluation of the recorded intensity distributions is the deviation of the actual shape of the optical surface 102 from the target shape thereof, from which the actual shape of the optical surface 102 is then derived.

Figure 2:
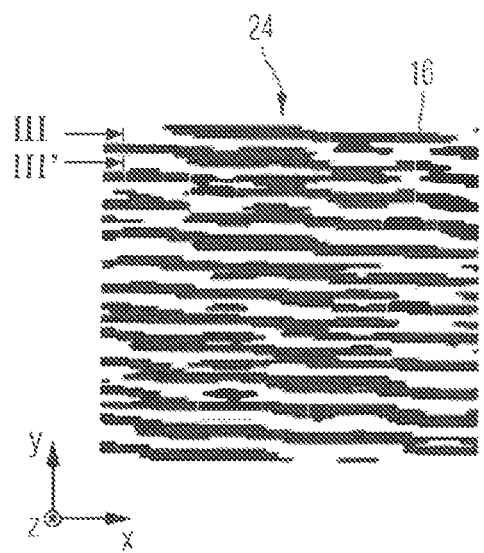
FIG. 2 shows a detail of an embodiment of a structure pattern of the diffractive shape measuring structures in accordance with FIG. 1 in plan view.

FIG. 2 shows a detail of an embodiment of a structure pattern 24 of the diffractive shape measuring structures 16 that extends along the used surface 14. In other words, the structure pattern 24 is understood to mean the pattern discernible in a plan view of the diffractive shape measuring structures 16. In the embodiment illustrated in FIG. 2, the structure pattern 24 of the diffractive shape measuring structures 16 is substantially formed by a pattern of horizontal lines, the respective shape of which is distorted in an irregular manner.

In accordance with one embodiment, the structure pattern 24 of the diffractive shape measuring structures 16 can be configured as a singly encoded CGH pattern for generating the test wave 122 from the incoming test radiation 108i in the test interferometer 100 configured as a Fizeau interferometer in accordance with FIG. 6. In accordance with further embodiments, the structure pattern 24 can also be configured as a multiply encoded CGH pattern. In the case of such a multiply encoded CGH pattern, the structure pattern 24 contains a superimposition of a plurality of CGH patterns, such that the incoming test radiation 108i is converted into a plurality of outgoing waves simultaneously in the first order of diffraction in each case. The outgoing waves here can comprise, in addition to the test wave 122, calibration waves and optionally, given the use of a type of interferometer with a reference mirror disposed downstream of the diffractive optical element 10, a reference wave as well. In accordance with one embodiment variant, the structure pattern 24 is configured as a quintuply encoded CHG structure pattern for generating the test wave 122, a reference wave and three calibration waves.

Figure 3:
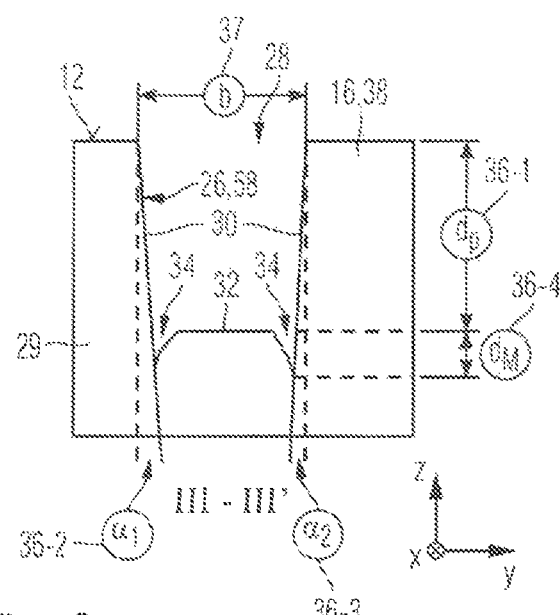
FIG. 3 shows a cross section through the diffractive shape measuring structures from FIG. 2 along the line III-III'.

FIG. 3 shows a cross section through the diffractive shape measuring structures 16 along the line III-III' in FIG. 2 and thus a profile line 26 of the relevant portion of the shape measuring structures 16, said profile line extending transversely with respect to the used surface 14. The profile line 26 substantially shows the profile of a trench 28 extending along the x-direction. The trench 28 has sidewalls, also called flank regions 30, and a bottom region 32. The width d of the trench 28 at the level of the surface 12 is designated by the reference sign 37. The level difference between the surface 12 of the diffractive optical element 10 and the bottom region 32 is referred to as profile depth $d_p$, (reference sign 36-1) or etching depth for the illustrated case where the trench 28 was produced by etching technology in the material 19 of the diffractive optical element 10. The material 19 can be a quartz glass, for example.

On account of the etching process, the flank regions 30 of the trench 28 do not extend completely perpendicularly, but rather are inclined in each case by a flank angle relative to the perpendicular to the surface 12; in this case, the flank angle of the left flank region 30 is designated by $\alpha_1$ (reference sign 36-2) and the flank angle of the right flank region 30 is designated by $\alpha_2$ (reference sign 36-3). Furthermore, the etching process used has the undesired side effect that microtrenches 34 form in each case at the transition between the flank regions 30 and the bottom region 32.

The depth $d_M$ of said microtrenches is designated by the reference signs 36-4 in FIG. 3. The profile depth 36-1 of the trench 28, the flank angles 36-2 and 36-3, the depth 36-4 of the microtrenches 34 and optionally further parameters are referred to as profile properties 36 of the profile line 26 of the shape measuring structures 16. If a target profile having perpendicular flank regions 30, a flat bottom region without microtrenches 34 and a predefined profile depth is assumed for the trench 28, then the profile properties 36 are parameters that can be used to characterize manufacturing deviations of the real profile line 26 of the shape measuring structures 16 from the target profile thereof. However, said manufacturing deviations result in unwanted aberrations in the wavefront of the test wave 122 in the test interferometer 100 in accordance with FIG. 6.

A lack of correction of these aberrations in the evaluation of the intensity distributions recorded by the detector camera 128 in turn results in defects in the shape of the optical surface 102 that is determined with the test interferometer 100. In order to enable a correction of the manufacturing deviations in the shape measuring structures 16, however, the test fields 18 mentioned above with reference to FIG. 1 are provided on the used surface 14 of the diffractive optical element 10. In this case, the test fields 18, on the basis of test structures 38 contained therein, make it possible to estimate the profile properties 36 of the shape measuring structures 16 as precisely as possible and to provide them to the evaluation unit 130 of the test interferometer 100 for defect correction in the determination of the shape of the optical surface 102.

Figure 4:
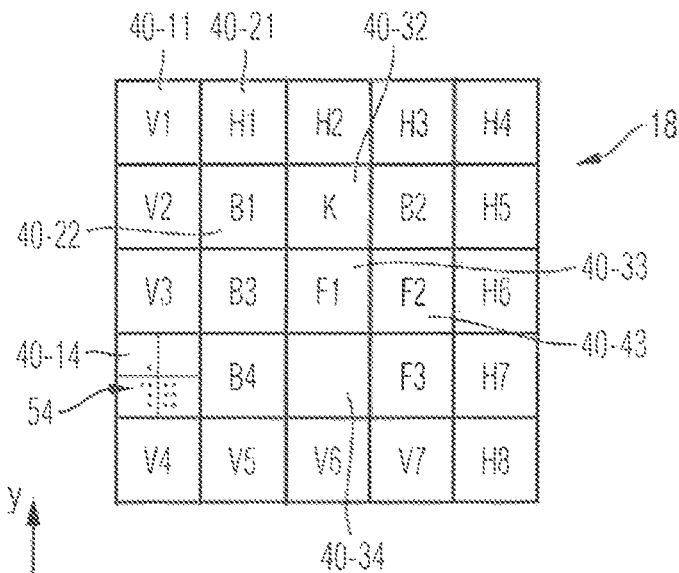
FIG. 4 shows an embodiment of one of the test fields in accordance with FIG. 1 in plan view with a multiplicity of test field sections.

FIG. 4 illustrates an embodiment of one of the test fields 18 in plan view. This test field is configured as a matrix composed of test field sections 40 arranged in five rows and five columns. Further embodiments of the test fields 18 can also comprise matrices composed of more or fewer rows and columns. In the embodiment shown, the test field sections 40 have a rectangular, in particular square, shape and are designated according to the scheme 40-CR, where "C" stands for the relevant column and "R" stands for the relevant row in the matrix. In this regard, for instance, the test field section designated by "H1" in FIG. 4 is designated by the reference sign 40-21. In accordance with one embodiment, the side lengths of the test fields 18 lie in the range of 0.1 mm to 3 mm, in particular in the range of 0.5 mm to 1.5 mm.

Figure 5A:
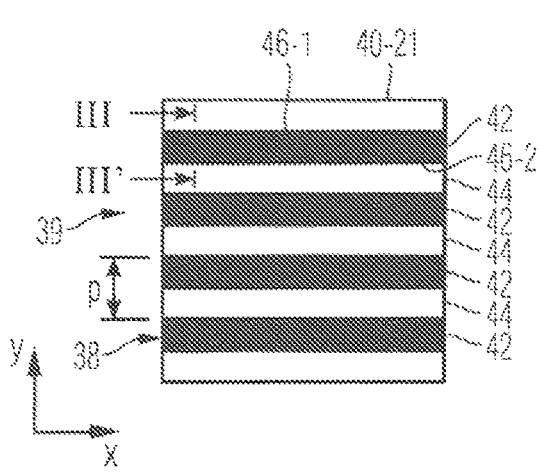
FIG. 5A shows an embodiment of one of the test field sections in accordance with FIG. 4 in the form of a so-called horizontal line test field section in plan view.

FIG. 5A shows the test field section 40-21 identified by "H1" in FIG. 4 in plan view. Said test field section, like the test field sections identified by "H3", "H4", "H5", "H6", "H7" and "H8", too, is configured as a so-called horizontal line test field section and to that end comprises test structures 38, the structure pattern 39 of which comprises parallel straight lines 42 arranged periodically horizontally, i.e. in the x-direction, in plan view. The lines 42 are separated by respective interspaces 44. The lines 42 each have an upper edge 46-1 and a lower edge 46-2. The structure pattern 39 of the horizontal line test field section 40-21 with the upper edges 46-1 and the lower edges 46-2 comprises in each case periodically repeating and identically oriented edges.

The periodicity of the edges 46-1 or respectively 46-2 is identified by the period p in FIG. 5A and, in accordance with one embodiment, lies below the resolution of a diffraction measuring station 60 operated with visible light, said diffraction measuring station being explained in greater detail below with reference to FIG. 7. In accordance with one embodiment, the resolution of such a diffraction measuring station lies below 300 μm, in particular below 100 μm, below 50 μm or below 10 μm.

In accordance with various embodiment variants, the periodicity of the edges 46-1 or respectively 46-2 can lie for instance between 100 nm and 1 μm, in particular between 300 nm and 800 nm, e.g. can be approximately 500 nm. In this case, the ratio of the respective width of the lines 42 and the respective width of the interspaces 44, the so-called width/gap ratio, can vary between 1:1, as illustrated in FIG. 5A, and 1:10. The test field sections identified by "H2", "H3", "H4", "H5", "H6", "H7" and "H8" in FIG. 4 comprise periodically arranged parallel straight lines 42 of the type illustrated in FIG. 5A with different width/gap ratios and/or different periodicities p; in particular, they can comprise lines 42 having different widths with the same periodicity.

If the test structures 38 in accordance with FIG. 5A are viewed along the line in cross section, then a profile line 58 of the relevant portion of the test structures 38 arises which corresponds structurally to the profile line 58 of the relevant portion of the shape measuring structures 16 as illustrated in FIG. 3. That is to say that the profile of the sequence of interspace 44, line 42 and further interspace 44 along the line in accordance with FIG. 5A is likewise the profile of a trench 28 extending along the x-direction. Said trench 28 also has flank regions 30, a bottom region 32 and microtrenches 34. The corresponding profile properties 36, in particular the profile depth 36-1 of the trench 28, the flank angles 36-2 and 36-3 and the depth 36-4 of the microtrenches 34, can thus also be determined for the test structures 38 and be used as an approximate estimation of the corresponding profile properties 36 of the shape measuring structures 16 arranged in the environment of the relevant test field 18.

Figure 5B:
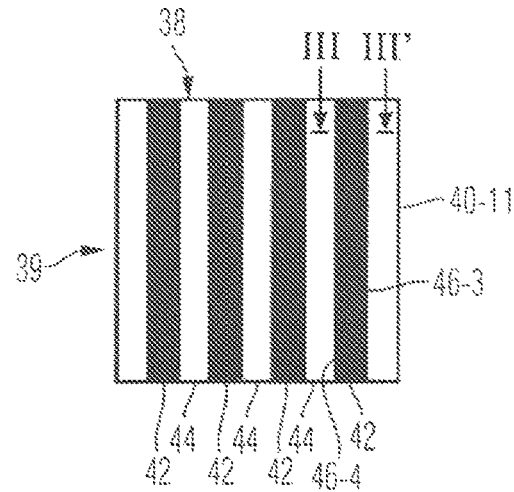
FIG. 5B shows an embodiment of one of the test field sections in accordance with FIG. 4 in the form of a so-called vertical line test field section in plan view.

FIG. 5B shows the test field section 40-11 identified by "V1" in FIG. 4 in plan view. Said test field section, like the test field sections identified by "V2", "V3", "V4", "V5", "V6" and "V7", too, is configured as a so-called vertical line test field section. The vertical line test field sections comprise test structures 38, the respective structure pattern 39 of which comprises parallel straight lines 42 arranged periodically vertically, i.e. in the y-direction, in plan view. The structure pattern 39 in accordance with FIG. 5B arises here as a result of rotation of the structure pattern 39 in accordance with FIG. 5A by 90°. For the right edges 46-3 and left edges 46-4 of the lines 42, the explanations given above with regard to the edges 46-1 and 46-2 of the horizontal line test field section 40-21 in accordance with FIG. 5A hold true analogously in regard to their periodicity. If the test structures 38 in accordance with FIG. 5B are viewed along the line III-III' extending in the x-direction in cross section, then the profile line 58 illustrated in the y-z cross-sectional plane in FIG. 3 arises analogously for the x-z cross-sectional plane. The test field sections identified by "V2", "V3", "V4", "V5", "V6" and "V7" in FIG. 4 comprise periodically arranged parallel straight lines 42 of the type illustrated in FIG. 5B with different width/gap ratios and different periodicities p.

Figure 5C:
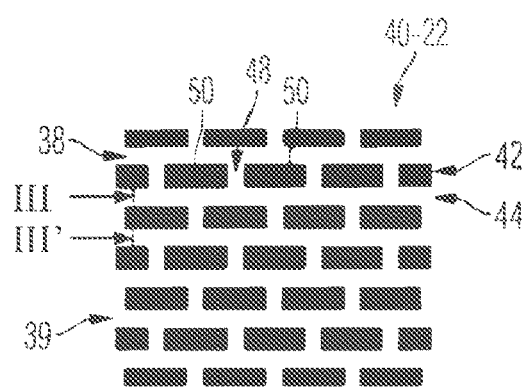
FIG. 5C shows an embodiment of one of the test field sections in accordance with FIG. 4 in the form of a so-called brick pattern test field section in plan view.

FIG. 5C shows the test field section 40-22 identified by "B1" in FIG. 4 in plan view. Said test field section, like the test field sections identified by "B2", "B3" and "B4", too, is configured as a so-called brick pattern test field section. To that end, the test field section 40-22 comprises rows— arranged in the horizontal direction—of periodically arranged two-dimensional structures in the form of rectangular structures 50 or brick-shaped structures. Said rows are repeated in the y-direction, interrupted by linear interspaces 44, with successive rows being offset in each case in the x-direction, thus resulting in a brick pattern. In an alternative characterization, the structure pattern in accordance with FIG. 5C also corresponds to the line pattern in accordance with FIG. 5A with the difference that regular interruptions 48 are provided in the lines 42. The test field sections identified by "B2", "B3" and "B4" in FIG. 4 each comprise brick patterns of the type shown in FIG. 5A, but differ therefrom in particular in the orientation of the lines 42, the periodicity of the lines 42, the line/gap ratio, the periodicity of the interruptions 48 and/or the offset pattern of the rows of bricks.

Figure 5D:
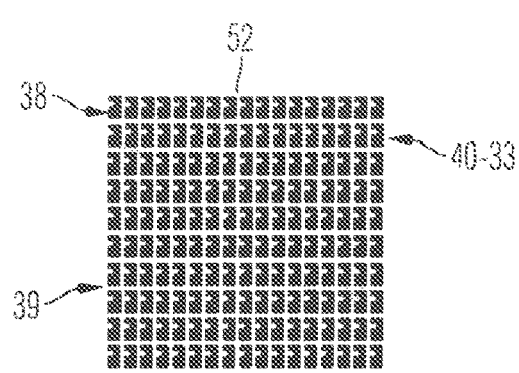
FIG. 5D shows an embodiment of one of the test field sections in accordance with FIG. 4 in the form of a first so-called F-pattern test field section in plan view.
Figure 5E:
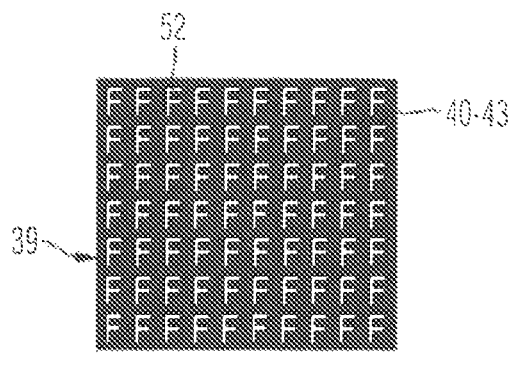
FIG. 5E shows an embodiment of one of the test field sections in accordance with FIG. 4 in the form of a second so-called F-pattern test field section in plan view.

FIGS. 5D and 5E show the test field sections 40-33 and 40-43 identified by "F1" and "F2", respectively, in FIG. 4 in plan view. These test field sections and the test field section identified by "F3" are configured as so-called F-pattern test field sections and to that end comprise periodically arranged 2-dimensional structures in the form of the letter "F". The structure patterns 39 in the various F-pattern test field sections can differ in terms of periodicity, spacing and size of the letter "F", as is the case between the structure patterns 39 in FIGS. 5D and 5E, and/or the orientation of the letter "F".

The structure patterns 39 of the test structures 38 in the individual test field sections 40 of the test fields 18 described above are chosen in a targeted manner such that some or all of the abovementioned profile properties 36 can be measured with a particularly high measurement accuracy with a measuring device provided therefor. In any case the structure patterns 39 of the test structures 38 are configured such that some or all of the profile properties 36 are measurable, with the measuring device provided therefor, with a measurement accuracy which is increased by comparison with a measurement accuracy achievable during a measurement of the corresponding profile properties 36 of the shape measuring structures 16. In particular, the abovementioned diffraction measuring station 60 and a scanning probe microscope 84 explained in greater detail below with reference to FIG. 8 are conceivable as measuring device for measuring the profile properties 36.

The brick pattern test field sections (cf. FIG. 5C) identified by "B1" to "B4" in FIG. 4 and the F-pattern test field sections (cf. FIGS. 5D and 5E) identified by "F1" to "F3", in addition to the above-described suitability for measuring the profile properties characterizing the profile line 58 extending transversely with respect to the used surface 14, are also suitable for measuring one or more contour properties of the test structures 38. The measured contour properties of the test structures 38 can be applied to the relevant shape measuring structures 16. This is done analogously to how the profile properties 36 are applied as described below.

Figures 14A, 14B, 14C:
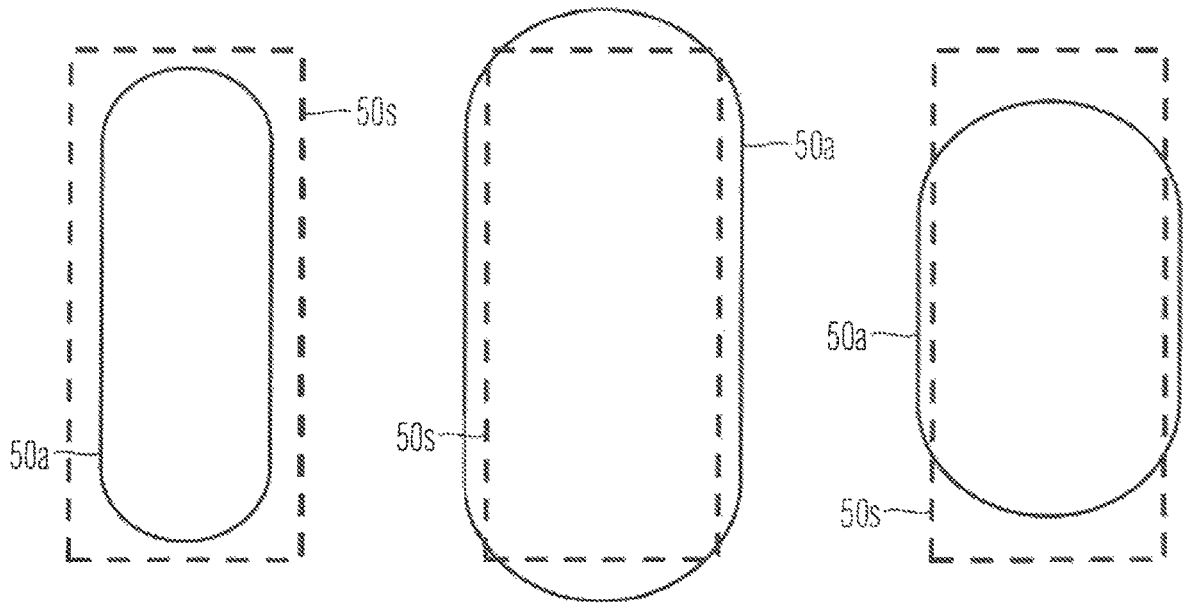
FIG. 14A shows an illustration of a rectangular structure with a first type of a contour deviation from its target shape.
FIG. 14B shows an illustration of a rectangular structure with a second type of a contour deviation from its target shape.
FIG. 14C shows an illustration of a rectangular structure with a third type of a contour deviation from its target shape.

A contour property should be understood to mean a shape property of a structure pattern of the test structures 38 extending along the used surface 14, as explained by way of example below with reference to FIGS. 14A to 14C. These figures each show different actual shapes 50a of a rectangular structure 50 in accordance with FIG. 5C, which deviate from a target shape 50s of the rectangular structure 50 in different ways. These deviations are classified as contour properties. In FIG. 14A, the actual shape 50a differs from the target shape 50s by virtue of an isotropic displacement of the rectangle edges and a rounding of the corners. In FIG. 14B, the edge offset is dependent on its immediate surroundings. Furthermore, the corner rounding is more greatly pronounced. FIG. 14C shows a particularly pronounced example of an anisotropic edge offset. The upper and lower edges are further out of position than the left and right edges. The corner roundings and edge displacements that can be seen in FIGS. 14A to 14C are typically attributable to diffusion and so-called proximity effects of the lithographic portion during the production of the diffractive optical element 10.

An embodiment of the structure pattern 39 in accordance with FIG. 5A or respectively FIG. 5B with lines and interspaces having a periodicity of approximately 500 nm and a width/gap ratio of 1:1 is particularly suitable for examining the flank shape of the test structures 38 with the diffraction measuring station 60. Intensity values ascertained with the diffraction measuring station 60 for this embodiment of the structure pattern 39 show a high correlation with the flank shape of the test structures 38. Thus, particularly the flank angles 36-2 and 36-3 of the profile line 58 can be derived from the relevant intensity values with high accuracy.

The use of 2-dimensional structures of higher complexity, such as, for instance, in the brick pattern test field sections in accordance with FIG. 5C or the F-pattern test field sections in accordance with FIG. 5D or FIG. 5E, serves in particular for providing geometric shapes in the structure patterns 39 of the test structures 38, which, in addition to the straight line pattern, is approximated to other geometric shapes contained in the structure pattern 24 of the shape measuring structures 16. In this regard, for instance, the rectangular structures 50 from the brick pattern test field section in accordance with FIG. 5C and the F-structures 52 in accordance with FIGS. 5D and 5F are suitable for simulating island-shaped structures or transitions between structure elements oriented perpendicularly to one another in the structure pattern 24 of the shape measuring structures.

Figure 5F:
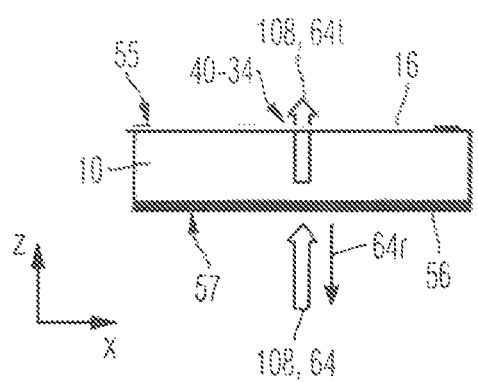
FIG. 5F shows a cross-sectional view of the diffractive optical element in accordance with FIG. 4 in the region of an unstructured test field section.

FIG. 5F shows the diffractive optical element 10 in the region of the test field section 40-34 in accordance with FIG. 4, which is configured as an unstructured test field section. The diffractive shape measuring structures 16 are arranged on a so-called used side 55 of the disk-shaped diffractive optical element 10. In the present embodiment, an antireflection coating 56 is applied on the rear side 57 of the diffractive optical element 10, said rear side being opposite to the used side 55. Said coating is adapted to the wavelength of the test radiation 108i incident on the diffractive optical element 10 in the test interferometer 100, i.e. the antireflection coating 56 is configured such that when the test radiation 108 enters the diffractive optical element 10 at the rear side thereof virtually no intensity is lost.

However, if test radiation 64 having a different wavelength is incident on the diffractive optical element 10 during the measurement of the test fields 18 with the diffraction measuring station 60 explained in greater detail below with reference to FIG. 7, then the effect of the antireflection coating 56 changes. Part of the test radiation 64 is reflected at the rear side 57 of the diffractive optical element 10 (reflected test radiation 64r). The intensity of the transmitted test radiation 64t is accordingly reduced.

In this case, the antireflection coating 56, depending on the wavelength of the test radiation 64, can furthermore have a reflection-reducing effect (destructive interference) or even a reflection-intensifying effect (constructive interference) by comparison with the reflection at the rear side 57 without an antireflection coating 56. The unstructured test field section 40-34 then serves for determining the influence of the antireflection coating 56 on the intensity of the transmitted test radiation 64t in the diffraction measuring station 60.

To that end, in the diffraction measuring station 60, a measurement of the unstructured test field section 40-34 and a corresponding measurement without arrangement of the diffractive optical element 10 are carried out for the different wavelengths of the test radiation 64. From these, with Fresnel's formulae being applied, the corresponding effect of the antireflection coating 56 on the measurements of other test field sections 40 of the test fields 18 is ascertained and correspondingly taken into account in the evaluation of these measurements.

Figure 13A:
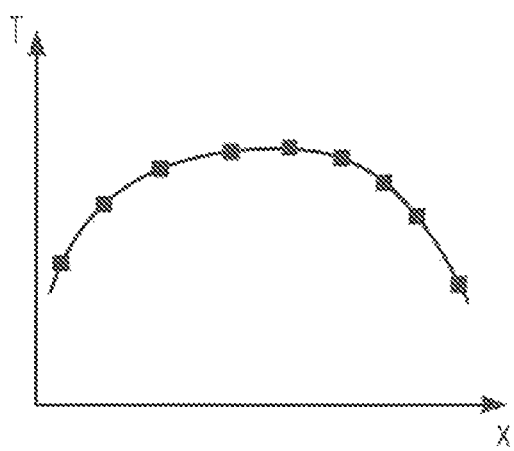
FIG. 13A shows an example of a transmission behavior of the diffractive optical element in relation to a test radiation incident in the diffraction measuring station in accordance with FIG. 7.
Figure 13B:
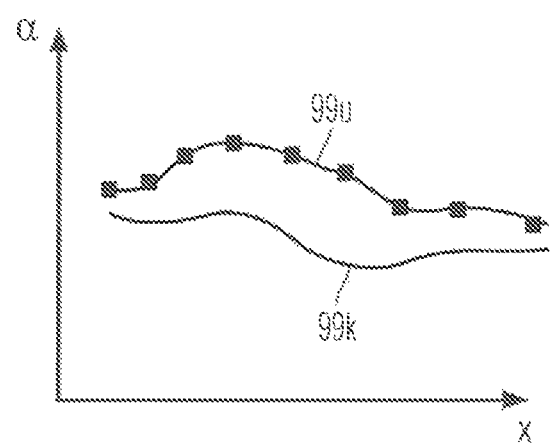
FIG. 13B shows a distribution of flank angles of a test structure ascertained with the diffraction measuring station in accordance with FIG. 7 before and after correction on the basis of the transmission behavior in accordance with FIG. 13A.

FIG. 13A shows an example of the transmission behavior of the test radiation 64 having a specific wavelength used by the diffraction measuring station 60 at test fields 18 of the diffractive optical element 10 (cf. FIG. 1) which are arranged along a line extending in the x-direction. In this case, the respective transmission value T was determined on the basis of the respective test field section 40-34 of the relevant test fields 18. As evident from FIG. 13A, the transmission at the given wavelength decreases toward the edges of the diffractive optical element 10. In order to illustrate the correction principle, FIG. 13B shows a distribution of flank angles α (36-2 or 36-3 in accordance with FIG. 3) before and after correction on the basis of the transmission behavior from FIG. 13A, said distribution being ascertained by evaluation of the measurements carried out with the diffraction measuring station 60 with the stated wavelength.

Furthermore, the test field 18 illustrated in FIG. 4 comprises a monitoring test field section 40-32 identified by the letter "K". Said monitoring test field section contains so-called monitoring structures corresponding to the shape measuring structures 16 arranged in the used surface 14. In other words, a segment of the pattern of the used surface 14 with the shape measuring structures 16 is arranged in the monitoring test field section 40-32. The monitoring test field section 40-32, which may also be referred to as a background window, is used in the diffraction measuring station 60 or the scanning probe microscope 84 for a monitoring measurement to establish whether the region in which the relevant test field 18 is arranged on the diffractive optical element 10 is representative of the regions of the used surface 14 that adjoin the relevant test field 18, such that the profile properties 36 ascertained by measurement of the test field 18 at the test structures 38 can be applied to the relevant shape measuring structures 16.

Furthermore, the test field 18 illustrated in FIG. 4 comprises a so-called reference test field section 40-14. This test field section comprises reference structures 54 resolvable with an optical microscope. These reference structures 54 can comprise markings that can be used to check a correct alignment of the test fields both with regard to rotation and with regard to translation. Furthermore, the reference structures 54 can each comprise an identification number for the unambiguous assignment of the measurements established with regard to a specific test field 18 to design properties of the test structures 38 on which the measurements are based. The information from the reference test field section 40-14 is used in particular during the measurement of the diffractive optical element 10 with the scanning probe microscope 84 described in greater detail below.

FIG. 7 shows an embodiment of the abovementioned diffraction measuring station 60 for measuring the profile properties 36 of the test structures 38 in the test fields 18 of the diffractive optical element 10. The diffraction measuring station 60 comprises a tunable test radiation source 62 for generating the test radiation 64 already mentioned above, said test radiation being monochromatic with a wavelength that is adjustable in the wavelength range between approximately 300 nm and 800 nm. Furthermore, the diffraction measuring station 60 comprises a first focusing lens element 66 for focusing the test radiation 64 provided by the test radiation source 62, a polarizer 68 arranged near the focal point of the first focusing lens element 66 and serving for polarizing the test radiation 64, and a second focusing lens element 70 for radiating the test radiation 64 in the form of a plane test wave 72 onto the whole area of the diffractive optical element 10 to be measured with regard to the profile properties 36.

After passing through the diffractive optical element 10, the test wave 72 is directed via two Fourier optical units 74 and 80 (the second Fourier optical unit 80 being symbolized by two lens elements in FIG. 7) onto an areally measuring detector 82, which can be embodied e.g. as a CCD sensor. An aperture stop 76 arranged between the two Fourier optical units 74 and 80 serves for eliminating radiation of a higher order of diffraction than the zero order of diffraction. In the present embodiment, the detector 82 serves to yield spatially resolved information about the brightness or intensity distribution provided by the diffractive optical element 10 in the zero order of diffraction.

The resolution of the diffraction measuring station 60 in the embodiment in accordance with FIG. 7, in which only an intensity distribution generated by the zero order of diffraction is evaluated, lies between 10 µm and 300 µm and thus far above the periodicities contained in the structure patterns 39 in accordance with FIGS. 5A to 5E. Therefore, these structure patterns are not resolved during the measurement with the diffraction measuring station 60. Rather, grayscale or intensity values arise for the individual test field sections 40.

During the measurement of the profile properties 36 of the test structures 38 with the diffraction measuring station 60 in accordance with FIG. 7, the following procedure is adopted: Through corresponding manipulation of the tunable test radiation source 62 and arrangement of different variants of the polarizer 68, test waves 72 with various combinations of different wavelengths and different polarization settings are successively radiated onto the diffractive optical element 10. A suitable analyzer 68 is arranged depending on the polarization property of the polarizer 68.

In accordance with one embodiment, 7 to 12 different wavelengths are combined with 2 to 4 different polarization settings. The wavelengths used preferably lie between 300 nm and 800 nm; in this regard, for example, the wavelengths 300 nm, 350 nm, 400 nm, 450 nm, 500 nm, 550 nm, 600 nm, 650 nm, 700 nm, 750 nm and 800 nm can be used. For example, the polarization directions 0°, 45°, 90° and 135° can be used as polarization settings. In the example mentioned, test waves 72 with 11×4, i.e. 44, different combinations of wavelength and polarization settings are radiated onto the diffractive optical element.

For each of the different combinations of wavelengths and polarization settings, the detector 82 of the diffraction measuring station 60 records an associated intensity distribution containing the intensity values assigned to the individual test field sections 40 on the surface 12 of the diffractive optical element 10.

In an evaluation unit 83, all the intensity values of all recorded intensity distributions that are assigned to the individual test field sections 40 are processed taking into account the design information of the various structure patterns 24 in accordance with FIGS. 5A to 5E in the individual test field sections 40 using an evaluation algorithm. This processing results in profile properties 36 of the profile lines 58 of the test structures 38, in particular the respective profile depth 36-1, the respective flank angles 36-2 and 36-3 and the respective depth 36-4 of microtrenches 34 in the profile lines 58 of the test structures 38 contained in the various test field sections 40. Further profile properties 36 of the profile lines 58 which can be ascertained as the result of the evaluation of the intensity distributions comprise so-called "notching" or so-called "trenching", for example, in which lower corners in the profile line 58 are indented or rounded out. Furthermore, material properties of the diffractive optical element 10, such as, for instance, variations in the refractive index, surface roughness or the above-explained contour properties of the test structures 38, can also be ascertained using the evaluation. In particular, structure widths of the test structures can also be determined.

In accordance with one embodiment, all vertical line test field sections 40-11, 40-12, 40-13, 40-15, 40-25, 40-35, 40-45, all horizontal line test field sections 40-21, 40-31, 40-41, 40-51, 40-52, 40-53, 40-54, 40-55, all brick pattern test field sections 40-22, 40-42, 40-23, 40-24, all F-pattern test field sections 40-33, 40-43, 40-44, and the monitoring test field section 40-32 and the unstructured test field section 40-34 are processed in this case.

From the profile properties 36 ascertained, using an evaluation algorithm based on rigorous calculations, the evaluation unit 83 ascertains the calibration values 86 already mentioned above with regard to the shape measuring structures 16 contained on the used surface 14 of the diffractive optical element 10. In this case, in accordance with one embodiment variant, in the calibration values 86 the profile properties 36 which were ascertained with regard to the individual test fields 18 distributed over the used surface 14 are respectively assigned to shape measuring structures 16 arranged in regions of the used surface 14 that adjoin the respective test field 18. Alternatively, the local assignment of the profile properties assigned to the shape measuring structures 16 can also be ascertained by interpolation of the profile properties ascertained at the individual test fields 18.

Figure 11:
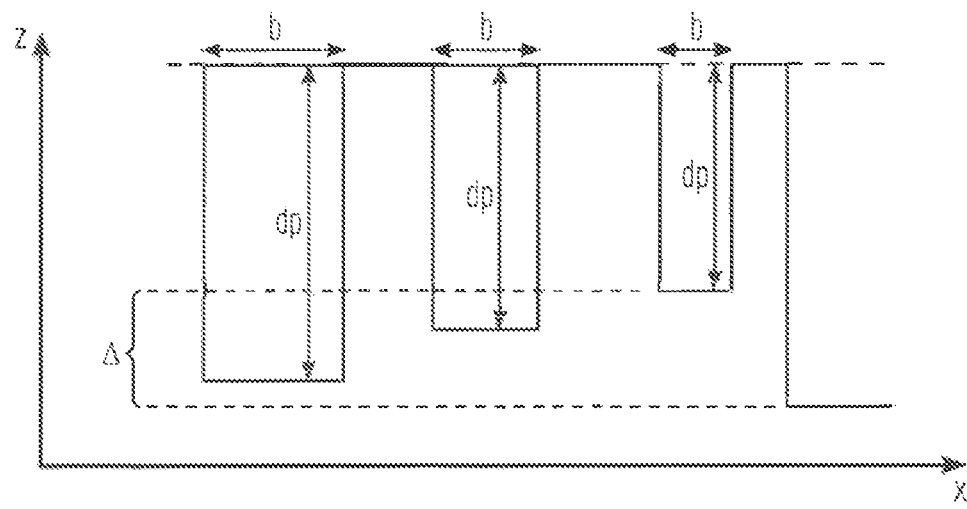
FIG. 11 shows an illustration of a relationship between the depth and the width of a trench of a test structure.

In accordance with one embodiment, when ascertaining the calibration values 86 of the shape measuring structures 16, the evaluation unit 83 uses a relationship—ascertained on the basis of the test fields 18—between the depth $d_p$ and the width b of a trench 28 (cf. FIG. 3). While this relationship can be based on an arbitrary function, in principle, the trench depth $d_p$ is often all the greater, the greater the width b of the trench 28, as illustrated in FIG. 11. This effect occurs, inter alia, during etching processes on the length scale of a few 100 nm.

Since, as mentioned above, the resolution of the diffraction measuring station 60 is above 10 µm, a direct detection of the effect is not possible. As mentioned above, the horizontal line test field sections 40-21, 40-31, 40-41, 40-51, 40-52, 40-53, 40-54, 40-55 and the vertical line test field sections 40-11, 40-12, 40-13, 40-15, 40-25, 40-35, 40-45 comprise regularly arranged lines 42 having different widths. The evaluation of the intensity values recorded by the diffraction measuring station 60 for the individual test field sections makes it possible, then, with assignment of the profile widths b known from the design, to ascertain the relationship between the depth $d_p$ and the width b of the trenches 28.

A similar procedure can be adopted in the case of the two-dimensional structures in the brick pattern test field sections 40-22, 40-42, 40-23, 40-24 and the F-pattern test field sections 40-33, 40-43, 40-44, the "trench widths" then changing there in both dimensions. This relationship is assumed to be representative of generic structures and is taken into account when ascertaining the calibration values 86 of the shape measuring structures 16 in the evaluation unit 83. Analogously to the variation of the profile depth $d_p$ as a function of the lateral structure definition, variations of the structure widths such as, for instance, the trench widths b and also other profile parameters such as, for instance, depth $d_p$ of microtrenches 34 (cf. FIG. 3) can also occur. These variations are detected and dealt with analogously in accordance with one embodiment. For two-dimensional structures it is possible, in particular, to detect relationships of the contour variation as a function of the surrounding trench widths—proximity effects of the lithography process of CGH production. Typical examples are the rounding of inner and outer corners (F-structures) and non-isotropic shape defects of the rectangles.

FIG. 8 describes the scanning probe microscope 84 (also designated as SPM), already mentioned above as an alternative measuring device for measuring the profile properties 36 of the test structures 38. In the example illustrated, the scanning probe microscope 84 is a scanning force microscope or an atomic force microscope (also designated as AFM). A measuring head 89 is incorporated in the scanning probe microscope 84.

The measuring head 89 is secured to a frame (not illustrated in FIG. 8) of the scanning probe microscope 84 with a holding unit 87. The frame allows the positioning of the diffractive optical element 10 at any arbitrary location, in any orientation. The holding unit 87 can be rotated about its longitudinal axis extending in the horizontal direction. A piezo-actuator 88 is attached to the holding unit 87 of the measuring head 89 and enables a movement of the free end of the piezo-actuator 88 in three spatial directions (not illustrated in FIG. 8). A bending beam, which hereinafter is referred to as cantilever 90, as is customary in the technical field, is secured to the free end of the piezo-actuator 88.

The cantilever 90 has a holding plate (not illustrated in FIG. 8) for securing to the piezo-actuator 88. The opposite end of the cantilever 90 with respect to the holding plate carries a measuring probe 92. In the embodiment illustrated, the measuring probe 92 is embodied such that it is pyramidal or conical at its free end. Furthermore, the measuring probe 92 can for example also be embodied such that it is cylindrical or in the shape of an inverted cone or hammer-like (also referred to as "re-entrant").

The cantilever 90 and the measuring probe 92 can be embodied in one piece. By way of example, the cantilever 90 and the measuring probe 92 can be manufactured from a metal, such as, for instance, tungsten, cobalt, iridium, a metal alloy or from a semiconductor, such as, for instance, silicon or silicon nitride. It is also possible to manufacture the cantilever 90 and the measuring probe 92 as two separate components and to subsequently connect these to one another. This can be effected by adhesive bonding, for example. In particular, the measuring probe 92 can also be produced in two separate steps.

The diffractive optical element 10 to be measured is fixed on a sample stage 94. This can be effected for example by the diffractive optical element 10 being placed on bearing points of the sample stage 94 in a vacuum or high vacuum environment.

As symbolized by arrows in FIG. 8, the sample stage 94 can be moved by a positioning system 96 in three spatial directions relative to the measuring head 96 of the scanning probe microscope 84. Furthermore, the sample stage 94 can be rotated about the normal to the diffractive optical element 10 (not shown in FIG. 8). In the example in FIG. 8, the positioning system 96 is embodied in the form of a plurality of micromanipulators. Furthermore or alternatively, the positioning system 96 can be equipped with stepper motors and/or linear drives for moving the diffractive optical element 10. An alternative embodiment of the positioning system 96 might be piezo-actuators. The positioning system 96 is controlled by signals of a control unit. In an alternative embodiment, the control unit does not move the sample stage 94, but rather the holding unit of the measuring head 89 of the scanning probe microscope 84. It is furthermore possible for the control unit to carry out a coarse positioning of the diffractive optical element 10 serving as sample in terms of height (z-direction) and for the piezo-actuator 88 of the measuring head 89 to perform a precise height setting of the scanning probe microscope 84.

Alternatively or additionally, in a further embodiment, the relative movement between the sample and the measuring probe 92 can be divided between the positioning system 96 and the piezo-actuator 88. By way of example, the positioning system 96 carries out the movement of the sample in the sample plane (xy-plane) and the piezo-actuator 88 enables the movement of the measuring probe 92 in the direction of the normal to the sample.

The scanning probe microscope 92 can be operated in a one-dimensional or a two-dimensional measuring mode. In the one-dimensional measuring mode, the measuring probe 92 scans the sample in a line-like manner in a predefined measuring direction, a high spatial resolution being achieved in the scanning direction and a comparatively low spatial resolution (typically a spatial resolution lower by a factor of 100) being achieved transversely with respect to the scanning direction on account of the line spacing chosen. In the two-dimensional measuring mode, the line spacing is reduced such that a high spatial resolution is likewise achieved transversely with respect to the scanning direction, for instance a spatial resolution lower than that in the scanning direction only by a factor of 10. However, the two-dimensional measuring mode is significantly more time-consuming that the one-dimensional measuring mode and is therefore avoided if possible.

In the one-dimensional measuring mode, scanning is preferably effected perpendicularly to the plane defined from the axes of symmetry of the cantilever 90 and of the measuring probe 92, measurement artefacts being reduced as a result. In the two-dimensional measuring mode, the measuring probe is preferably moved fast perpendicularly to that axis of symmetry, while the slower movement is effected perpendicularly thereto.

FIG. 9A shows a further detail—differing from the detail illustrated in FIG. 2—of an embodiment of a structure pattern 24 of the diffractive shape measuring structures 16 that extends along the used surface 14. In this case, the trench-shaped structures in cross section have very irregular shapes with flank regions having different orientations. If the structure pattern shown is then measured with the above-described scanning probe microscope 84 in the one-dimensional measuring mode with the horizontal scanning direction (in the x-direction) along the scanning line B-B', the profile line 26 illustrated in FIG. 9B results.

However, the exact structure of the profile line 26 is extremely dependent on the exact position of the scanning line in the y-direction. Furthermore, the flank angles of the measured profile line 26 are corrupted by the pyramid-like or cone-like shape of the measuring probe 92. However, the extent of corruption is dependent on the orientation of the flank regions 30 in the xy-plane, that is to say that very accurate knowledge of the flank orientation along the scanning line is necessary in order to precisely work out the influence of the shape of the measuring probe 92. On account of these measurement uncertainties, the measurement results ascertained during measurement of the structure patterns 24 of real shape measuring structures 16 in the one-dimensional measuring mode of the scanning probe microscope 84 are usually too inaccurate for the purpose of correcting the surface measurement in the test interferometer 100. By contrast, the measurement in the two-dimensional measuring mode is often too complex.

Figures 10A, 10B:
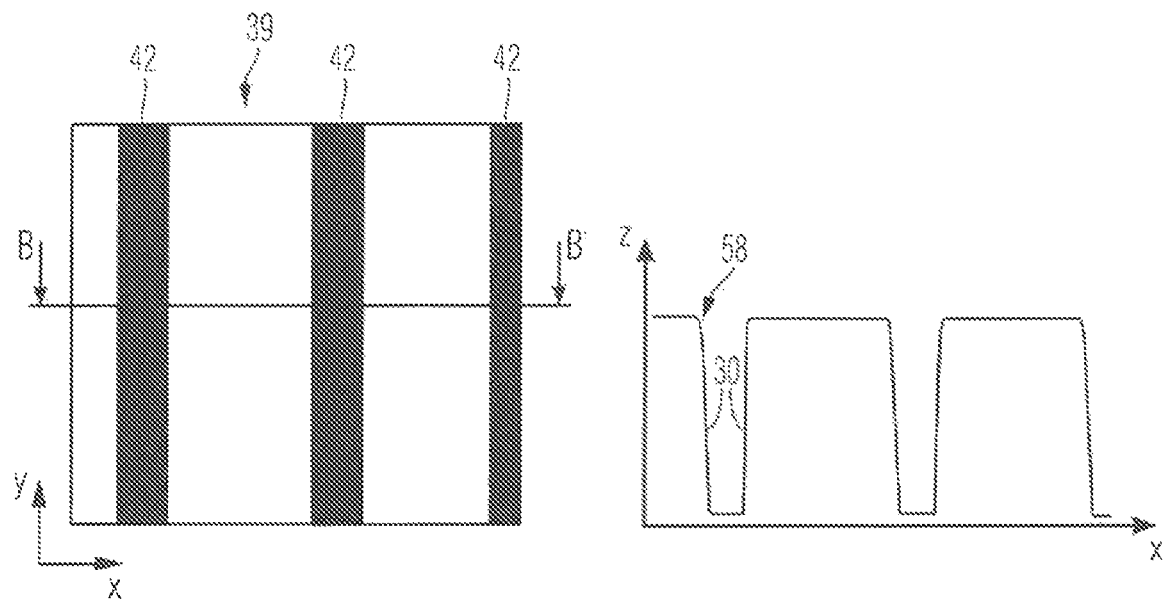
FIG. 10A shows an embodiment of a structure pattern of test structures of one of the test field sections in accordance with FIG. 4 in plan view.
FIG. 10B shows a cross section through the test structures in accordance with FIG. 10A along the line B-B'.

In accordance with one embodiment according to the invention, then, structure patterns 39 of the test structures 38 arranged in the test fields 18 are measured instead of the shape measuring structures 16. Referring to FIG. 4, all vertical line test field sections 40-11, 40-12, 40-13, 40-15, 40-25, 40-35, 40-45, all horizontal line test field sections 40-21, 40-31, 40-41, 40-51, 40-52, 40-53, 40-54, 40-55 and all brick pattern test field sections 40-22, 40-42, 40-23, 40-24 are appropriate here. FIG. 10B shows along the scanning line B-B' the profile line 58 of the structure pattern 39 in the form of vertical straight lines illustrated in FIG. 10A. Since, in this case, the orientation of the flank regions 30 varies independently of the position of the scanning line in the y-direction and furthermore also does not vary along the scanning line, the influence of the shape of the measuring probe 92 can be worked out very accurately from the measured profile line 58.

The relationship between the depth $d_p$ and the width b of a trench 28 as described above with reference to FIG. 11 can be ascertained with particularly high accuracy by corresponding measurement of the relevant profiles in the horizontal line test field sections 40-21, 40-31, 40-41, 40-51, 40-52, 40-53, 40-54, 40-55 and the vertical line test field sections 40-11, 40-12, 40-13, 40-15, 40-25, 40-35, 40-45 with the scanning probe microscope 84. The same applies to the two-dimensional structures in the brick pattern test field sections 40-22, 40-42, 40-23, 40-24 and the F-pattern test field sections 40-33, 40-43, 40-44. During the measurement, the reference test field section 40-14 is preferably used for the correct alignment of the corresponding test fields 18.

Figure 12A:
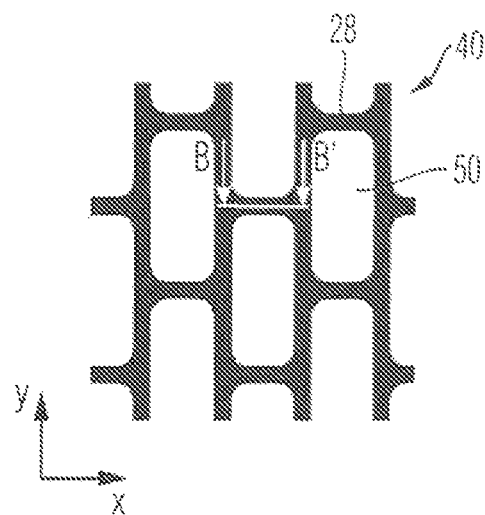
FIG. 12A shows an embodiment of a further structure pattern of test structures of one of the test field sections in accordance with FIG. 4 in plan view.

FIG. 12A shows a detail from a further embodiment of a test field section 40 having substantially the inverse structure of the brick pattern test field section 40-22 illustrated in FIG. 5C and rotated by 90°. In contrast to the structure pattern in accordance with FIG. 5C, in which the rectangular structures 50 are formed by trenches, the rectangular structures 50 in the structure pattern in accordance with FIG. 12A are surrounded by trenches 28.

Figure 12B:
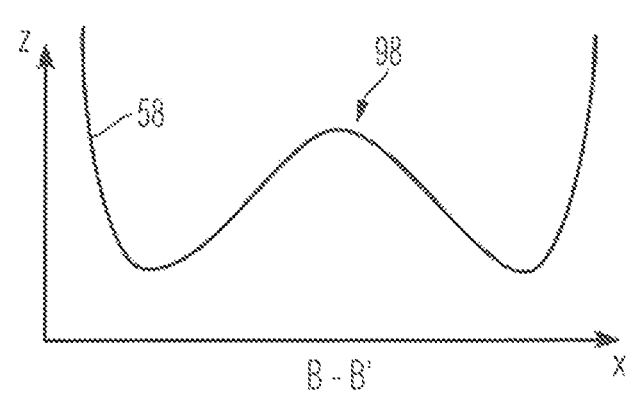
FIG. 12B shows a cross section through the test structures in accordance with FIG. 12A along the line B-B'.

FIG. 12B shows the profile line 58 measured along the line B-B' in FIG. 12A with the scanning probe microscope 84. Said profile line clearly reveals that the maximum trench depth is in the crossing regions between vertical and horizontal trench sections, while the trench depth has a minimum 98 at half the distance between the crossing regions on account of the small trench width prevailing there. The trench depth signature shown can be measured very precisely using the scanning probe microscope 84 and it is possible to use the corresponding relationship with the design of the structure pattern when ascertaining the calibration values 86 of the shape measuring structures 16.

From the vertical line test field sections 40-11, 40-12, 40-13, 40-15, 40-25, 40-35, 40-45, horizontal line test field sections 40-21, 40-31, 40-41, 40-51, 40-52, 40-53, 40-54, 40-55, brick pattern test field sections 40-22, 40-42, 40-23, 40-24 and F-pattern test field sections 40-33, 40-43, 40-44 measured with the scanning probe microscope 84, taking account of the monitoring test field section 40-32 and optionally taking account of the above-described relationships between design dimensions of the corresponding structure pattern and the trench depth, in an evaluation unit 97 of the scanning probe microscope 84, the profile properties 36 of the profile lines 58 of the test structures 38 are ascertained. As in the case of the measurement with the diffraction measuring station 60, the profile properties 36 can contain the profile depth 36-1, the respective flank angles 36-2 and 36-3 and the respective depth 36-4 of microtrenches in the profile lines 58 of the test structures 38 contained in the various test field sections 40.

Further profile properties 36 of the profile lines 58 which can be ascertained with the scanning probe microscope 84 comprise for example "notching" or "trenching", already explained with regard to the diffraction measuring station 60. Furthermore, using the scanning probe microscope 84, it is also possible to ascertain material properties of the diffractive optical element 10 in the surface roughness or else with regard to contour properties of the test structures 38. In particular, structure widths of the test structures can also be determined.

Analogously to the manner of operation of the evaluation unit 83 of the diffraction measuring station 60, the evaluation unit 83 depicted in FIG. 8 ascertains, from the profile properties 36 ascertained, the calibration values 86 with regard to the shape measuring structures 16 contained on the used surface 14 of the diffractive optical element 10.

In accordance with one embodiment variant according to the invention, in each case at least some of the vertical line test field sections 40-11, 40-12, 40-13, 40-15, 40-25, 40-35, 40-45, horizontal line test field sections 40-21, 40-31, 40-41, 40-51, 40-52, 40-53, 40-54, 40-55, brick pattern test field sections 40-22, 40-42, 40-23, 40-24 and F-pattern test field sections 40-33, 40-43, 40-44 are measured both with the diffraction measuring station 60 and with the scanning probe microscope 84 as described above. From the measurement results, optionally taking suitably into account the monitoring test field section 40-32, the unstructured test field section 40-34 and the above-described relationships between design dimensions of the corresponding structure pattern and the trench depth, the profile properties 36 of the profile lines 58 of the test structures 38 are ascertained. In other words, the test fields are measured using a plurality of different measurement methods, in the present case using the measurement methods based on the diffraction measuring station 60 and the scanning probe microscope 84, and the profile properties 36 are determined by computation of the measurement results ascertained using the different measurement methods.

Further measurement methods that can be used here comprise transmission electron measurements (TEM), measurements using a near field scanning microscope, such as, for instance, so-called TSOM (Through Focus Scanning Optical Microscope), x-ray measurements (XRT), and scatterometry methods carried out independently of the diffraction measuring station, such as goniometry, ellipsometry, reflectometry, etc.

The computation of the measurement results ascertained using the different measurement methods can be effected for example using the Bayesian approach described in the publication "Improving optical measurement uncertainty with combined multitool metrology using a Bayesian approach", Applied Optics, Vol. 51, No. 25, September 2012, pages 6196-6206, using iteration back and forth and/or using a parameter separation. Furthermore, it is possible to use a common comprehensive model for the different measurement methods.

Figure 15:
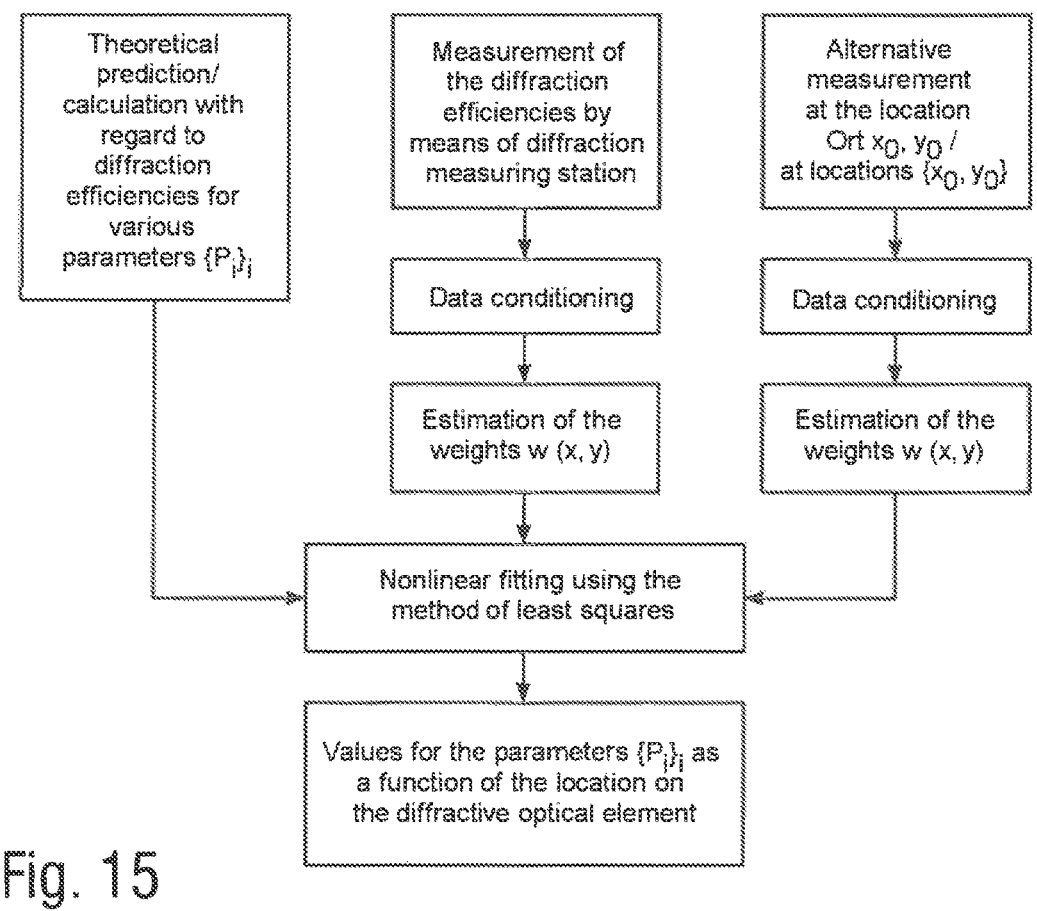
FIG. 15 shows a flow diagram for illustrating an exemplary embodiment of a computation of measurement results ascertained using different measurement methods.

One exemplary embodiment of the computation of the measurement results ascertained with the diffraction measuring station 60 with measurement results which were ascertained by an alternative measurement method is illustrated in the flow diagram in accordance with FIG. 15. In accordance with this exemplary embodiment, three different data sets are computed by nonlinear fitting using the method of least squares.

The first data set is determined by a theoretical prediction or a calculation with regard to diffraction efficiencies for various parameters $\{P_i\}_i$, $\{P_i\}_i$ is the set of parameters describing the geometric surface of the diffractive optical element 10. These parameters concern in particular geometric properties, such as profile properties and/or contour properties, of test structures 38 contained in the test fields 18. In this regard, for example, $P_1$=etching depth, $P_2$=flank angle and $P_3$=web width/contour variation.

The second data set comprises weights w(x,y) that are ascertained by measurement of the diffraction efficiencies (referred to above as intensity values) with the diffraction measuring station 60, data conditioning and corresponding estimation of the weights w(x,y). The third data set comprises weights w(x,y) that are ascertained by ascertaining measurement values using the alternative measurement method, such as, for instance, the measurement method carried out with the scanning probe microscope 84, data conditioning and corresponding estimation of the weights w(x,y).

The data conditioning is generally necessary since the measuring unit typically does not measure the relevant parameters directly, but rather only data related thereto. By way of example, the scanning probe microscope 84 measures relative height changes and absolute etching depths can then be derived by way of an external calibration sample. In a similar manner, the diffraction measuring station 60 carries out measurement twice, with and without a diffractive optical element 10 in the beam path; the resulting diffraction efficiency is the quotient of these two measurements.

The estimation of the weights of the measurement information is performed in order, in the case of the hybrid use of a plurality of measuring unit that is present here, to correctly take account of their different measurement accuracies. By way of example, the scanning probe microscope 84 can be implemented in particular because it can predict the etching depth particularly precisely, whereas microtrenches are measurable only very coarsely with the scanning probe microscope. In accordance with one embodiment variant, the weight is chosen reciprocally with respect to the measurement error, i.e.

$$w_i(x, y) \sim \frac{1}{\Delta P_i},$$

with x, y indicating the location on the diffractive optical element 10 and $\Delta P_i$ being the measurement error of the i-th parameter.

The result of the computation of the three data sets with nonlinear fitting using the method of least squares is values for the parameters $\{P_i\}_i$ as a function of the location on the diffractive optical element 10. Fitting using the method of least squares (also referred to as "non-linear least square fit") is a form of nonlinear regression in which the weighted squares of the differences in the individual measurement channels are minimized:

$$D=(\{w(x,y;\lambda,p)|I_m(x,y;\lambda,p)-I_R(x,y;\lambda,p;\{P_i(x,y)\}_i)|^2\}, \{w_i(x_0,y_0;x,y)|P_i^m-P_i(x,y)|^2\}_i)$$

In this case, w(x,y; p) stands for the weight at the location (x,y) of the diffractive optical element 10 for the measurement with the wavelength λ and the polarization p. $I_m(x,y; λ, p)$, analogously with regard to x,y, λ, p stands for the measured intensity in the zero order of diffraction. $I_R(x,y; λ, p; \{P_i(x,y)\}_i)$ stands for the calculated intensity with variation of the manufacturing parameters $P_i$ of the diffractive optical element 10 at this location. The second part represents the use of a second measuring unit, which, for example, like the scanning probe microscope 84, has direct access to the geometric parameters $P_i$. w ($x_0$, $y_0$; x, y) describes the possibility that such a measurement of the parameters $P_i$ did not take place at the location (x,y) at which reconstruction is effected, but rather occurred at a somewhat more distant test field 18 at the position ($x_0$, $y_0$). $P_i^m$ stands for the measured value of the parameter, while $P_i$, analogously to the occurrence in $I_R$, is a variation parameter of the fit.

Since the number of measurement channels is restricted in diffraction measuring stations and a certain residual error can also occur in the measurement data, in practice with detailed CGH manufacturing defect models the situation arises that a plurality of combinations of CGH manufacturing defects can plausibly explain the measured diffraction efficiencies. This corresponds to a plurality of local minima in the merit function during profile parameter reconstruction. It is not possible to state which local minimum is the physical minimum (the profile parameters that most likely describe the CGH actually manufactured), not even by comparison of their "depth", i.e. of the merit function values. By defining a profile parameter, a second measuring unit (e.g. scanning probe microscope, in particular AFM) can then decide which of the local minima is the physical minimum.

Furthermore, it is possible to identify specific profile parameters in the zero order of diffraction of the diffraction measurement only with difficulty or not at all. One example of this is the profile flank angle. Particularly the case of asymmetric flank angles, e.g. left flank 85° and right flank 95° (overhang), is not detectable with regard to the sign (i.e. whether left or right flank overhanging) in the zero order of diffraction for reasons of symmetry. In the phase, i.e. for the order of diffraction, used by the shape measuring structures, the sign is crucial, however. Here the measurement in the marker with a scanning probe microscope, in particular with an AFM, can correctly define the sign. Horizontal and vertical line structures considered jointly also help to detect a pronounced tilt along the CGH radius.

The above description of exemplary embodiments, embodiments or embodiment variants should be understood to be by way of example. The disclosure effected thereby firstly enables the person skilled in the art to understand the present invention and the advantages associated therewith, and secondly encompasses alterations and modifications of the described structures and methods that are also apparent in the understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 Diffractive optical element
12 Surface
14 Used surface
16 Diffractive shape measuring structures
18 Test field
20 Preferred region
22 Forbidden region
24 Structure pattern of the shape measuring structures
26 Profile line of the shape measuring structures
28 Trench
29 Material
30 Flank region
32 Bottom region
34 Microtrench
36 Profile property
36-1 Profile depth
36-2 Flank angle left
36-3 Flank angle right
36-4 Depth of the microtrench
37 Width of the trench
38 Test structures
39 Structure pattern of the test structures
40 Test field section
40-11 Vertical line test field section
40-14 Reference test field section
40-21 Horizontal line test field section
40-22 Brick pattern test field section
40-32 Monitoring test field section
40-33 F-pattern test field section
40-34 Unstructured test field section
40-43 F-pattern test field section
42 Straight line
44 Interspace
46-1 Upper edge
46-2 Lower edge
46-3 Right edge
46-4 Left edge
48 Interruption
50 Rectangular structure
50a Actual shape of the rectangular structure
50s Target shape of the rectangular structure
52 F-structure
54 Reference structures
55 Used side
56 Antireflection coating
57 Rear side
58 Profile line of the test structures
60 Diffraction measuring station
62 Tunable test radiation source
64 Test radiation
64r Reflected test radiation
64t Transmitted test radiation
66 First focusing lens element
68 Polarizer
70 Second focusing lens element
72 Test wave
74 First focusing lens element
76 Aperture stop
78 Analyzer
80 Second Fourier optical unit
82 Detector
83 Evaluation unit
84 Scanning probe microscope
86 Calibration values
87 Holding unit
88 Piezo-actuator
89 Measuring head
90 Cantilever
92 Measuring probe
94 Sample stage
96 Positioning system
97 Evaluation unit
98 Minimum of the trench depth
99u Uncorrected flank angle distribution
99k Corrected flank angle distribution
100 Test interferometer
102 Optical surface
104 Test object
106 Test radiation source
108 Test radiation
108i Incoming test radiation
110 Optical axis
112 Beam splitter
114 Focusing lens element
116 Reference element
118 Fizeau surface
120 Reference wave
122 Test wave
122r Reflected test wave
124 Stop
126 Eyepiece
127 Interferometry module
128 Detector camera
130 Evaluation unit

What is claimed is:

1. A diffractive optical element for a test interferometer for measuring a shape of an optical surface, comprising:
diffractive shape measuring structures arranged on a used surface of the diffractive optical element and configured to adapt a wavefront of test radiation to form a test wave for irradiating the optical surface to be measured when the diffractive optical element is arranged in the test interferometer, and
at least one test field configured to facilitate measuring a plurality of profile properties of test structures contained in the test field,
wherein the profile properties characterize a profile line of the test structures extending transversely with respect to the used surface and comprise a flank angle of the profile line of the test structures, a profile depth of the test structures and a depth of a microtrench which occurs in a bottom region of a trench-shaped profile of the test structures, and
wherein the test field is arranged at one location of the used surface instead of the diffractive shape measuring structures such that the test field is surrounded by a plurality of the diffractive shape measuring structures.

2. The diffractive optical element as claimed in claim 1, wherein at least ten test fields are arranged at a plurality of locations of the used surface in each case instead of the diffractive shape measuring structures such that the respective test field is surrounded by a plurality of the diffractive shape measuring structures.

3. The diffractive optical element as claimed in claim 2, wherein at least some of the test fields have a regular arrangement.

4. The diffractive optical element as claimed in claim 1, wherein the test structures and the shape measuring structures each have a structure pattern extending along the used surface and a profile line extending transversely with respect to the used surface and characterized by at least one profile property, wherein the structure pattern of the test structures is configured such that a measurement accuracy achievable during a measurement of the profile property of the test structures is increased in comparison with a further measurement accuracy achievable during a measurement of the profile property of the shape measuring structures.

5. The diffractive optical element as claimed in claim 1, wherein structure patterns of the test structures of a respective test field are configured to facilitate measuring different profile properties of the test structures.

6. The diffractive optical element as claimed in claim 1, wherein a structure pattern of the test structures is configured for a measurement with a diffraction measuring station.

7. The diffractive optical element as claimed in claim 1, wherein a structure pattern of the test structures is configured for measurement with a scanning probe microscope.

8. The diffractive optical element as claimed in claim 1, wherein a structure pattern of the test structures is configured both for measurement with a diffraction measuring station and for measurement with a scanning probe microscope.

9. The diffractive optical element as claimed in claim 1, wherein a structure pattern of the test structures has periodically repeating and identically oriented edges, wherein the periodicity of the edges lies below a resolution of a diffraction measuring station operated with visible light.

10. The diffractive optical element as claimed in claim 9, wherein the test fields each comprise further test structures having likewise periodically repeating and identically oriented edges, wherein the edges of the further test structures are oriented transversely with respect to the edges of the test structures.

11. The diffractive optical element as claimed in claim 1, wherein the test structures have periodically arranged two-dimensional structures.

12. The diffractive optical element as claimed in claim 1, wherein the test field comprises an unstructured test field section, wherein the diffractive optical element has an antireflection coating at least in the region of the unstructured test field section.

13. A test interferometer for measuring a shape of an optical surface, comprising:
a diffractive optical element as claimed in claim 1, and
an interferometry module configured to generate an interference pattern by superimposing a reference wave with the test wave formed with the diffractive shape measuring structures following interaction of the test wave with the optical surface.

14. A calibration method for calibrating a diffractive optical element comprising diffractive shape measuring structures arranged on a used surface of the diffractive optical element and each configured to adapt a wavefront of test radiation to form a test wave when the diffractive optical element is arranged in a test interferometer configured for measuring a shape of an optical surface, wherein the test wave is arranged to irradiate the optical surface to be measured, comprising:
arranging the diffractive optical element in a measuring device and measuring test fields arranged at a plurality of locations of the used surface and each having test structures having a profile line extending transversely with respect to the used surface, for ascertaining a plurality of profile properties of the test structures relating to the profile line, wherein the profile properties comprise a flank angle of the profile line of the test structures, a profile depth of the test structures and a depth of a microtrench which occurs in a bottom region of a trench-shaped profile of the test structures, and
determining, from the profile properties ascertained, a calibration value for calibrating the shape measuring structures during the measurement of the optical surface.

15. The calibration method as claimed in claim 14, wherein the measuring device comprises a diffraction measuring station, further comprising:
during the measurement of the test fields, radiating a plurality of test waves each differing in at least one optical parameter onto the test fields, and
ascertaining at least one of the profile properties by evaluating intensity distributions of the test waves recorded with the diffraction measuring station after interaction with the test fields.

16. The calibration method as claimed in claim 15, wherein the different test waves differ in wavelength and/or polarization.

17. The calibration method as claimed in claim 14, wherein the measuring device comprises a scanning probe microscope.

18. The calibration method as claimed in claim 14, wherein the test fields are measured using a plurality of different measurement methods and the profile properties are determined by computing the measurement results ascertained using the different measurement methods.

19. A measuring method for measuring a shape of an optical surface, comprising:
determining a calibration value of a diffractive optical element with the calibration method as claimed in claim 14,
generating a test wave with the shape measuring structures of the diffractive optical element,
recording an interferogram generated by superimposing a reference wave with the test wave after interacting with the optical surface, and
determining the shape of the optical surface by evaluating the recorded interferogram in accordance with the calibration value.

20. A method for producing diffractive optical elements for a test interferometer for measuring a shape of an optical surface, comprising:
producing the diffractive optical elements with in each case diffractive shape measuring structures arranged on a used surface of the respective diffractive optical element and configured to adapt a wavefront of test radiation to form a test wave for irradiating the optical surface to be measured when the respective diffractive optical element is arranged in the test interferometer, wherein at least one test field is arranged at one location of the used surface of each of the diffractive optical elements instead of the diffractive shape measuring structures such that the at least one test field is surrounded by a plurality of the diffractive shape measuring structures, and monitoring a production process stability by measuring the test fields of the diffractive optical elements.

* * * * *

UNITED STATES PATENT AND TRADEMARK OFFICE
CERTIFICATE OF CORRECTION

| | |
|---|---|
| PATENT NO. | : 12,235,097 B2 |
| APPLICATION NO. | : 17/675516 |
| DATED | : February 25, 2025 |
| INVENTOR(S) | : Winkler et al. |

Page 1 of 1

It is certified that error appears in the above-identified patent and that said Letters Patent is hereby corrected as shown below:

On the Title Page

Page 2, Column 2, under item (56) OTHER PUBLICATIONS at Line 8, delete "Instrumention" and insert -- Instrumentation --.

Page 2, Column 2, under item (56) OTHER PUBLICATIONS at Line 15, delete ""Improvcing" and insert -- "Improving --.

In the Specification

Column 11, Line 16, delete "piezeoelement." and insert -- piezo element. --.

Column 13, Line 42, after "the line" insert -- III-III' --.

Column 13 Line 47, after "the line" insert -- III-III' --.

Column 19, Line 26, delete "$d_P$" and insert -- $d_p$ --.

Column 19, Line 30, delete "$d_P$" and insert -- $d_p$ --.

Column 23, Line 33, delete "$\{P_i\}i$," and insert -- $\{P_i\}i$. --.

Column 24, Line 25, delete "w(x,y; p)" and insert -- w(x,y; λ, p) --.

Signed and Sealed this
Twenty-fourth Day of June, 2025

Coke Morgan Stewart
*Acting Director of the United States Patent and Trademark Office*